United States Patent
Uchida et al.

(10) Patent No.: US 11,452,171 B2
(45) Date of Patent: Sep. 20, 2022

(54) ELECTRONIC APPARATUS AND METHOD

(71) Applicant: KABUSHIKI KAISHA TOSHIBA, Tokyo (JP)

(72) Inventors: Daisuke Uchida, Kawasaki Kanagawa (JP); Koji Akita, Yokohama Kanagawa (JP); Takafumi Sakamoto, Machida Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/014,327

(22) Filed: Sep. 8, 2020

(65) Prior Publication Data
US 2021/0127452 A1 Apr. 29, 2021

(30) Foreign Application Priority Data

Oct. 28, 2019 (JP) .............................. JP2019-195361

(51) Int. Cl.
*H04W 84/20* (2009.01)
*H04W 88/02* (2009.01)
*H04W 88/06* (2009.01)
*H04W 56/00* (2009.01)

(52) U.S. Cl.
CPC ......... *H04W 84/20* (2013.01); *H04W 56/001* (2013.01); *H04W 88/027* (2013.01); *H04W 88/06* (2013.01)

(58) Field of Classification Search
CPC ... H04W 84/20; H04W 88/027; H04W 88/06; H04W 56/001
See application file for complete search history.

(56) References Cited

U.S. PATENT DOCUMENTS

| | | | |
|---|---|---|---|
| 7,200,504 B1* | 4/2007 | Fister | G01K 13/20 |
| | | | 702/75 |
| 2008/0049882 A1* | 2/2008 | Scholz | H04H 20/18 |
| | | | 375/360 |
| 2017/0289959 A1 | 10/2017 | Aki et al. | |
| 2017/0331460 A1* | 11/2017 | Rokhsaz | H01Q 1/2225 |

FOREIGN PATENT DOCUMENTS

JP 6508538 B2 8/2019

* cited by examiner

*Primary Examiner* — Jamal Javaid
(74) *Attorney, Agent, or Firm* — Holtz, Holtz & Volek PC

(57) ABSTRACT

According to one embodiment, an electronic apparatus includes a transmitter and a processor. The transmitter transmits a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two. The processor switches a pattern to be used among the patterns in accordance with a communication situation.

18 Claims, 33 Drawing Sheets

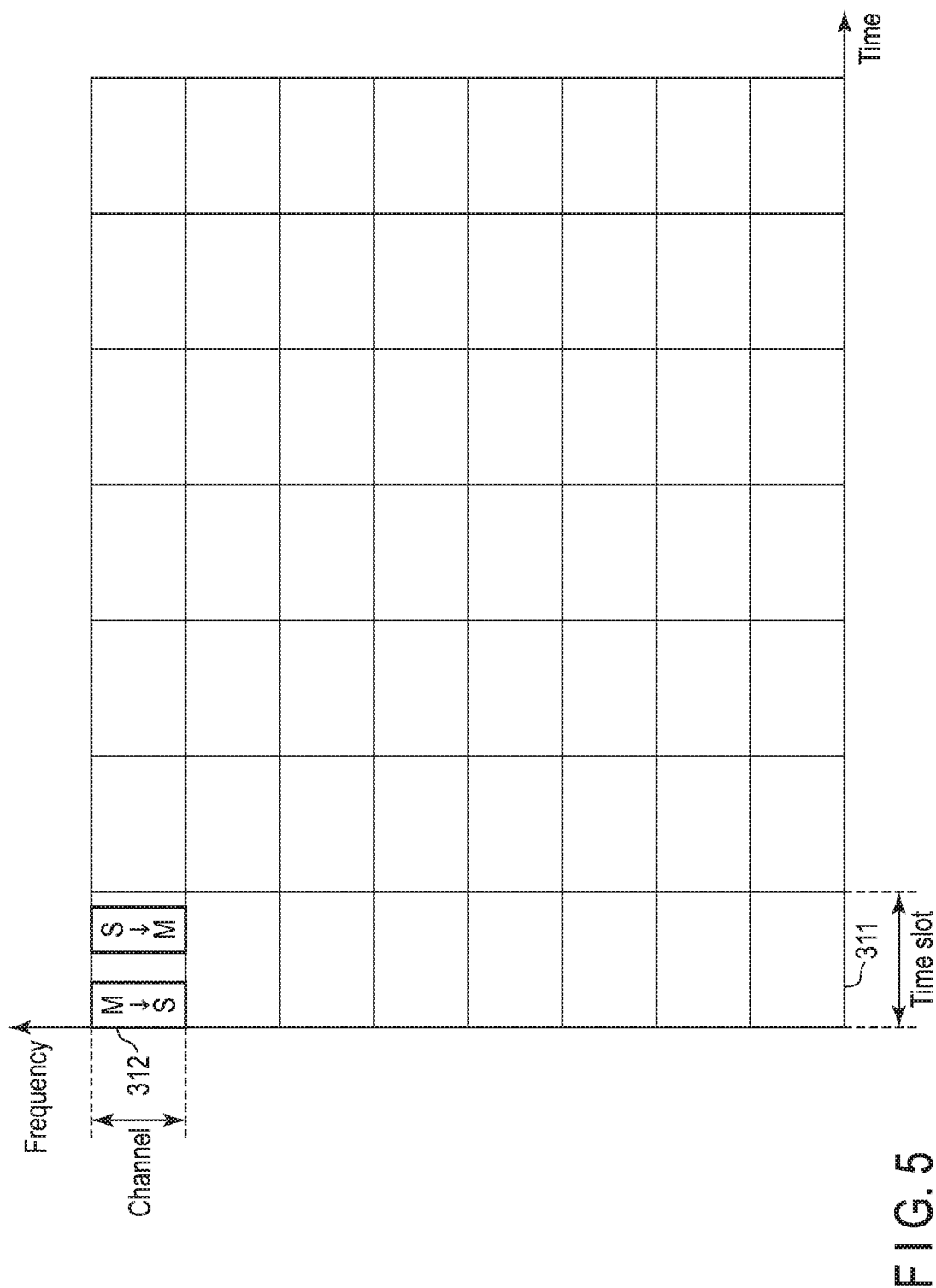
F I G. 5

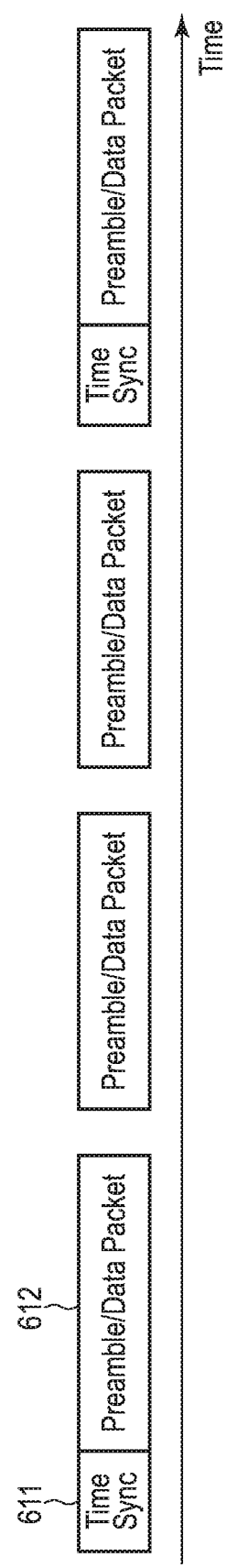
F I G. 17

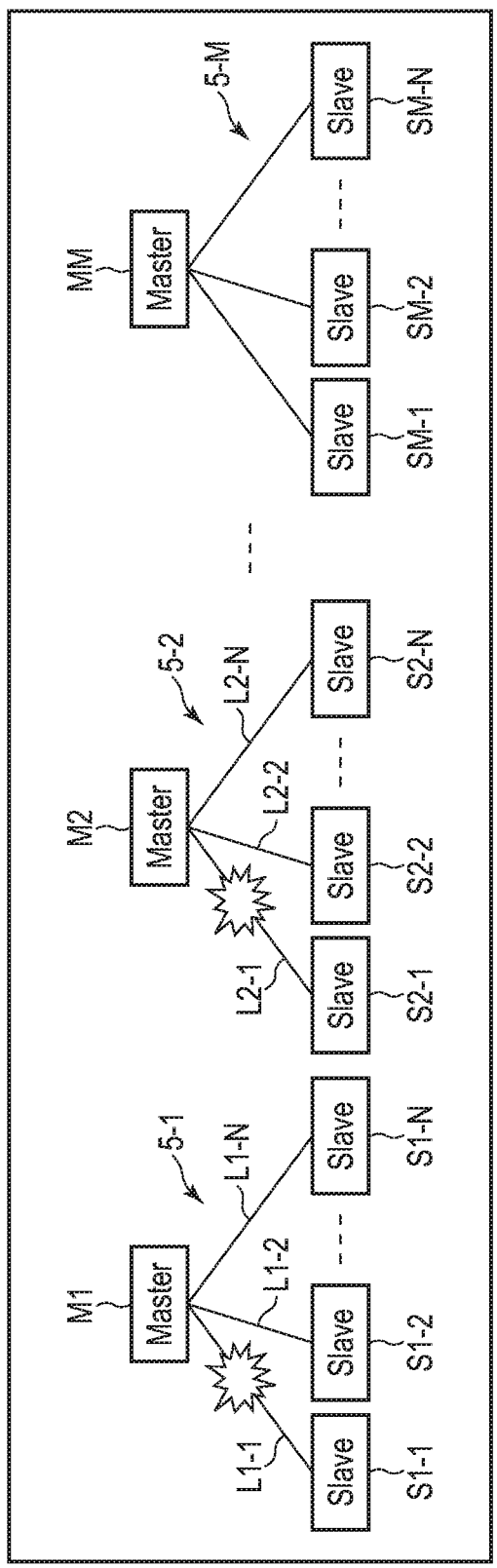
F I G. 30

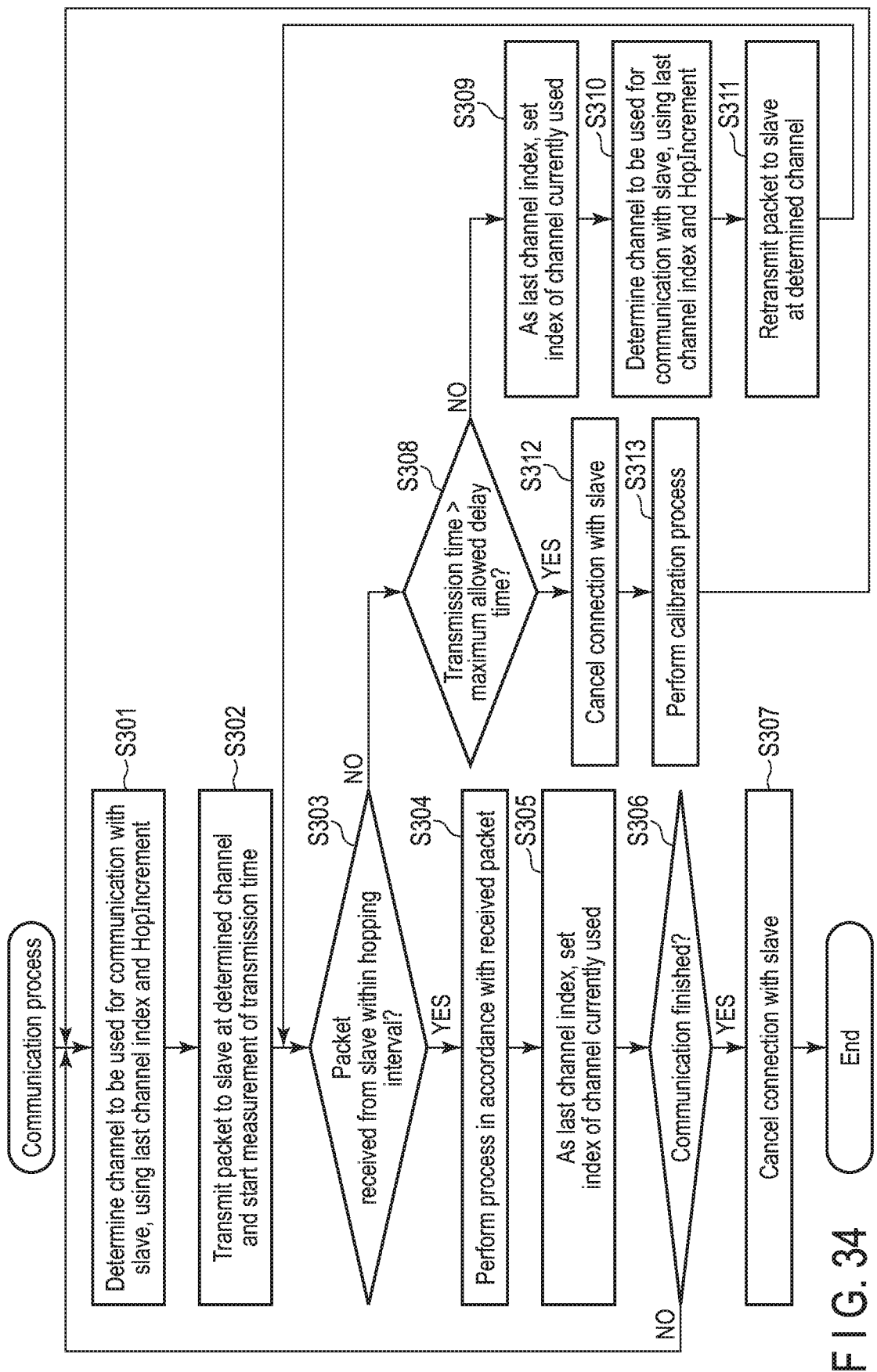
F I G. 34

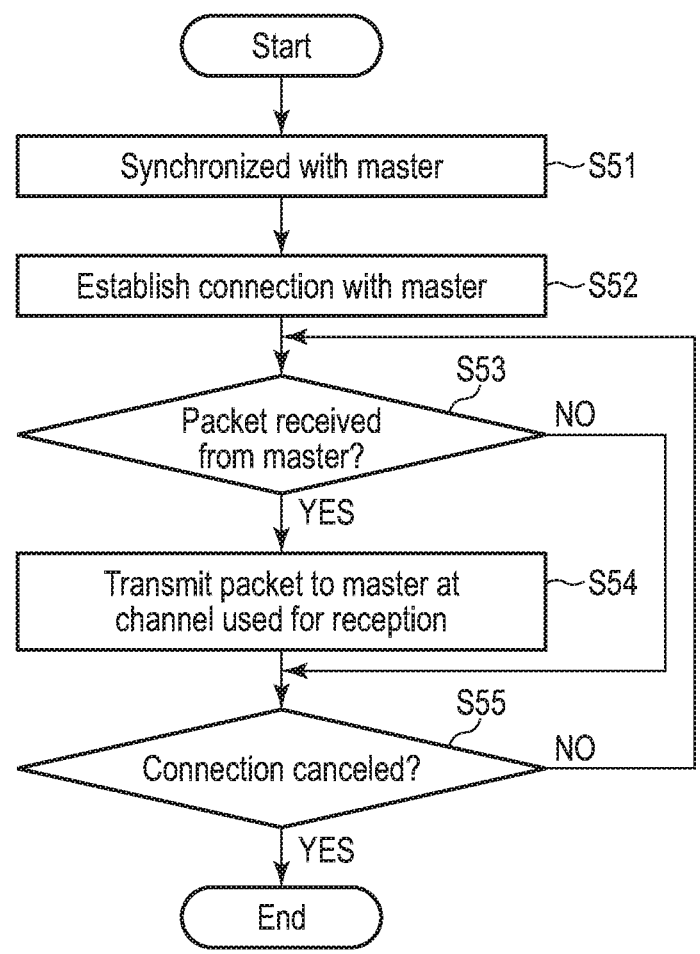
F I G. 35

ELECTRONIC APPARATUS AND METHOD

CROSS-REFERENCE TO RELATED APPLICATIONS

This application is based upon and claims the benefit of priority from Japanese Patent Application No. 2019-195361, filed Oct. 28, 2019, the entire contents of which are incorporated herein by reference.

FIELD

Embodiments described herein relate generally to wireless communication.

BACKGROUND

In a case where multiple wireless communication systems using overlapped frequency bands are operated, interference may be caused among the wireless communication systems. In each wireless communication system, for example, an electronic apparatus which functions as a master communicates with multiple electronic apparatuses which function as slaves. The master changes the frequency band (that is, the channel) used for the communication with the slaves in turn by using, for example, frequency hopping. In this way, interference among the wireless communication systems is reduced.

However, in a case where a large number of wireless communication systems are operated, even if each master changes the frequency band used for the communication with slaves by using frequency hopping, there is a possibility that the amount of interference among the wireless communication systems is increased. Thus, the realization of a new function for reducing interference with the other wireless communication systems is required.

BRIEF DESCRIPTION OF THE DRAWINGS

FIG. 5 is a diagram illustrating an example in which packets are exchanged between a master and a slave in a specific period at a specific frequency band (channel).

FIG. 17 is a diagram illustrating an example of a synchronous signal used for the synchronization of FIG. 16.

FIG. 30 is a diagram for explaining an example of the link to be reconfigured.

FIG. 34 is a flowchart illustrating an example of the procedure for a communication process performed by a master.

FIG. 35 is a flowchart illustrating an example of the procedure for a communication control process performed by a slave.

DETAILED DESCRIPTION

Embodiments will be described hereinafter with reference to the accompanying drawings.

In general, according to one embodiment, an electronic apparatus includes a transmitter, a processor and a receiver. The transmitter transmits a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two. The processor switches a pattern to be used among the patterns in accordance with a communication situation. The receiver receives a signal from the first electronic apparatus at the same frequency band as one of the first to n-th frequency bands used at time of lastly transmitting the signal to the first electronic apparatus.

Figure 1:
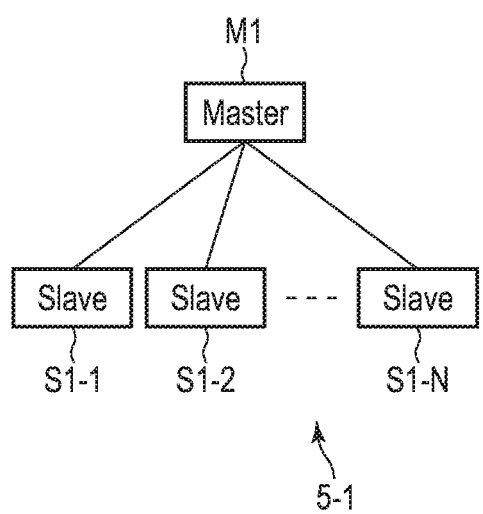
FIG. 1 is a block diagram illustrating a configuration example of a wireless communication system including an electronic apparatus according to an embodiment.

This specification explains a configuration example of a wireless communication system 5-1 including an electronic apparatus according to an embodiment, with reference to FIG. 1. The wireless communication system 5-1 includes an electronic apparatus M1 which functions as a master device, and N electronic apparatuses S1-1, S1-2, ..., S1-N which function as slave devices, where N is an integer greater than or equal to one. Hereinafter, an electronic apparatus which functions as a master device may be called a master, and an electronic apparatus which functions as a slave device may be called a slave.

The master M1 and each of the slaves S1-1, S1-2, ..., S1-N include wireless communication functions for performing wireless communication, respectively. The master M1 and the slaves S1-1, S1-2, ..., S1-N perform wireless communication conformable to, for example, Bluetooth (registered trademark) Low Energy (BLE), using the wireless communication functions.

The master M1 manages the slaves S1-1, S1-2, ..., S1-N through wireless communication. The master M1 may be realized as a computer, a mobile information terminal, or an embedded system incorporated into various electronic apparatuses.

The slaves S1-1, S1-2, ..., S1-N provide the master M1 with information obtained in the respective slaves, using wireless communication. Each of the slaves S1-1, S1-2, ..., S1-N may be realized as an electronic apparatus comprising the structure to be managed by the master M1. The structure to be managed by the master M1 is, for example, an actuator, a sensor, a processor, a battery module, or an electric power generation module. The slaves S1-1, S1-2, ..., S1-N may transmit various types of information related to these structures to the master M1.

Hereinafter, as an example, this specification mainly explains a case where the master M1 and the slaves S1-1, S1-2, ..., S1-N perform wireless communication conformable to BLE.

Figure 2:
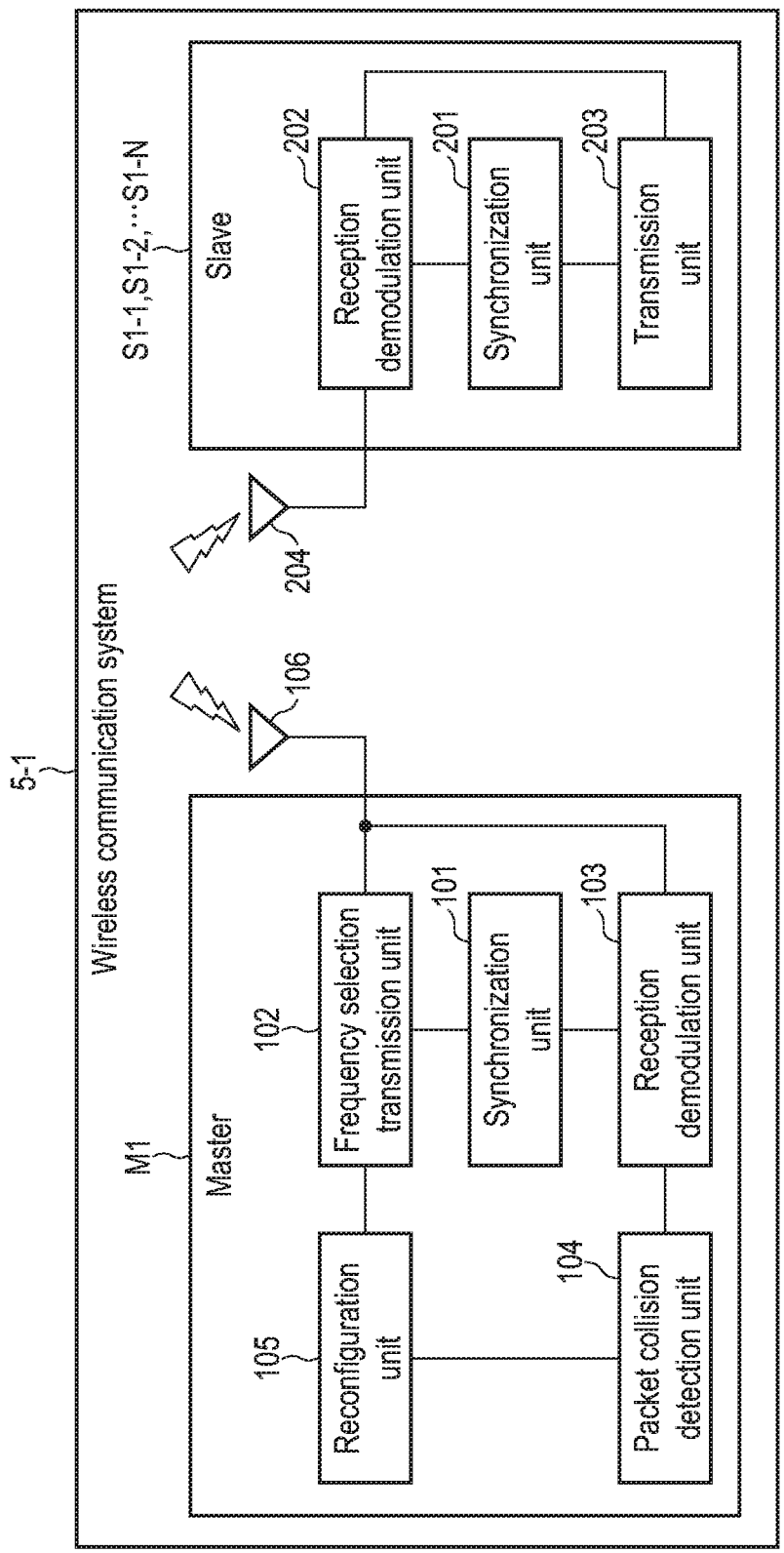
FIG. 2 is a block diagram illustrating a functional configuration example of the wireless communication system of FIG. 1.

FIG. 2 illustrates a functional configuration example of the master M1 and each of the slaves S1-1, S1-2, ..., S1-N.

The master M1 comprises a synchronization unit 101, a frequency selection transmission unit 102, a reception demodulation unit 103, a packet collision detection unit 104, a reconfiguration unit 105, and an antenna 106. The synchronization unit 101, the frequency selection transmission unit 102, the reception demodulation unit 103, the packet collision detection unit 104, and the reconfiguration unit 105 may be realized by hardware such as a circuit, software executed by one or more processors, or a combination thereof.

The synchronization unit 101 performs a process for synchronizing the master M1 and another electronic apparatus. The other electronic apparatus may be each of the slaves S-1, S1-2, ..., S1-N, or may be a master in another wireless communication system. The specific operation for synchronization is explained later with reference to FIG. 15 to FIG. 19.

When a connection with a slave S1-X is established, the frequency selection transmission unit 102, the reception demodulation unit 103, the packet collision detection unit 104, and the reconfiguration unit 105 perform a calibration process for selecting a transition pattern of frequency bands (that is, channels) to be used in accordance with the communication situation, in order to select a transition pattern in which interference with the other wireless communication systems is less. The communication situation may be changed in accordance with, for example, the transition patterns of channels used in the other wireless communication systems. The frequency selection transmission unit 102 transmits a signal to the slave S1-X at a frequency band specified in the selected transition pattern. Note that the slave S1-X is one of the slaves S1-1, S1-2, ..., S1-N.

The frequency selection transmission unit 102 transmits a signal to the slave S1-X with one of transition patterns including at least a first transition pattern which is a first order and which uses first to n-th frequency bands in first to n-th periods and a second transition pattern which is a second order different from the first order and which uses the first to n-th frequency bands in the first to n-th periods, where n is an integer greater than or equal to two. The frequency selection transmission unit 102 transmits a signal to the slave S1-X via the antenna 106 with one of these transition patterns.

The frequency selection transmission unit 102 determines each transition pattern using a first method for periodically changing the frequency band. Each transition pattern is the periodic transition pattern of the frequency band to be used to transmit and receive signals in the link between the master M1 and the slave S1-X.

More specifically, the frequency selection transmission unit 102 determines each of transition patterns using the first method with a parameter randomly determined. For example, the frequency selection transmission unit 102 determines a first transition pattern using the first method with a first parameter which is randomly determined. The frequency selection transmission unit 102 determines a second transition pattern using the first method with a second parameter which is randomly determined. Each of the parameters is equivalent to the frequency interval (HopIncrement) of two frequency bands which are continuous in a corresponding transition pattern. The first method is, for example, the frequency hopping used in BLE.

The frequency selection, transmission unit 102 may include a transmitter and at least one processor. For example, the transmission of signals is performed by the transmitter (i.e., hardware). The determination of each transition pattern is performed by the at least one processor executing programs (i.e., software).

The reception demodulation unit 103 may receive a signal from the slave S1-X via the antenna 106 at the same frequency band as one of the first to n-th frequency bands that was used at the time of lastly transmitting a signal. The reception demodulation unit 103 may demodulate a received signal and perform a process in accordance with the signal.

The frequency selection transmission unit 102, the packet collision detection unit 104 and the reconfiguration unit 105 switch the transition pattern to be used among the above transition patterns in accordance with the communication situation. More specifically, the reconfiguration unit 105 switches the transition pattern to be used among the transition patterns by canceling the connection with the slave S1-X and reestablishing the connection with the slave S1-X in accordance with the communication situation obtained by the reception demodulation unit 103 and the packet collision detection unit 104. The frequency selection transmission unit 102 transmits a signal to the slave S1-X with the transition pattern after the switching.

Alternatively, the reconfiguration unit 105 may switch the transition pattern to be used among the transition patterns by restarting at least one of the frequency selection transmission unit 102 and the reception demodulation unit 103 in accordance with the communication situation obtained by the reception demodulation unit 103 and the packet collision detection unit 104. For example, the reconfiguration unit 105 shuts oft the power supplied to a circuit including the frequency selection transmission unit 102, a circuit including the reception demodulation unit 103, or a circuit including the frequency selection transmission unit 102 and the reception demodulation unit 103, and subsequently, resumes the power supply, thereby restarting at least one of the frequency selection transmission unit 102 and the reception demodulation unit 103.

The packet collision detection unit 104 detects that the signal transmitted with one of the transition patterns did net reach the slave S1-X for more than the maximum allowed delay time. The maximum allowed delay time is the maximum time of delay which is allowed at the time of transmitting a packet. In other words, when a signal for transferring a packet is transmitted with one of the transition patterns, the packet collision detection unit 104 detects that the signal did not reach the slave S1-X for more than the maximum allowed delay time. There is a possibility that at least one of a packet transferred from the master M1 to the slave S1-X and a packet transferred from the slave S1-X to the master M1 does not reach the destination when packet collision is caused by interference between the wireless communication system 5-1 and another wireless communication system.

For example, when the packet collision detection unit 104 detects that a signal transmitted with the first transition pattern did not reach the slave S1-X for more than the maximum allowed delay time, the reconfiguration unit 105 randomly determines the second parameter. The frequency selection transmission unit 102 determines the second transition pattern using the first method with the second parameter. In other words, the reconfiguration unit 105 reconfigures (switches) the allocation of the transition pattern for the slave S1-X. In accordance with this reconfiguration, the frequency selection transmission unit 102 transmits a signal to the slave S1-X with the second transition pattern.

Further, when the packet collision detection unit 104 detects that the signal transmitted with the second transition pattern did not reach the slave S1-X for more than the maximum allowed delay time, the reconfiguration unit 105 randomly determines a third parameter. The frequency selection transmission unit 102 determines a third transition pattern using the first method with the third parameter. For example, the frequency selection transmission unit 102 determines the third transition pattern which is a third order different from the first order and the second order and which uses the first to n-th frequency bands in the first to n-th periods. In other words, the reconfiguration unit 105 reconfigures the allocation of the transition pattern for the slave S1-X. In accordance with this reconfiguration, the frequency selection unit 102 transmits a signal to the slave S1-X with the third transition pattern.

Each of the slaves S1-1, S1-2, ... , S1-N comprises a synchronization unit 201, a reception demodulation unit 202, a transmission unit 203, and an antenna 204. The synchronization unit 201, the reception demodulation unit 202 and the transmission unit 203 may be realized by hardware such as a circuit, software executed by one or more processors, or a combination thereof.

The synchronization unit 201 of the slave S1-X performs a process for synchronizing the slave S1-X and the master M1. The specific operation for synchronization is explained later with reference to FIG. 18 and FIG. 19.

The reception demodulation unit 202 receives a signal from the master M1 via the antenna 204 with the transition pattern that is determined by the master M1 in accordance with the communication situation from transition patterns including at least the first transition pattern which is the first order and which uses the first to n frequency bands in the first to n-th periods and the second transition pattern which is the second order different from the first order and which uses the first to n-th frequency bands in the first to n-th periods. The reception demodulation unit 202 may demodulate a received signal and perform a process in accordance with the signal.

The transmission unit 203 transmits a signal to the master M1 via the antenna 204 at the same frequency band as one of the first to n-th frequency bands that was used at the time of lastly receiving a signal from the master M1. For example, the transmission unit 203 transmits a signal for transferring ACK and information to the master M1 as a reply to a received signal.

As an example of the specific operation, this specification explains a case where a first signal for transferring a packet is transmitted from the master M1 to the slave S1-X.

Firstly, the frequency selection transmission unit 102 of the master M1 transmits the first signal to the slave S1-X at a first frequency band included in the first transition pattern. When the first signal reached the slave S1-X, the reception demodulation unit 103 may receive a second signal from the slave S1-X at the first frequency band. When the reception demodulation unit 103 receives the second signal, the frequency selection transmission unit 102 transmits a signal different from the first signal to the slave S1-X at a second frequency band. When the signal different from the first signal reached the slave S1-X, the reception demodulation unit 103 may further receive a signal from the slave S1-X at the second frequency band.

Thus, in a case where both a signal from the master M1 to the slave S1-X and a signal from the slave S1-X to the master M1 reach the respective destinations at the frequency band transitioning (hopping) in accordance with the first transition pattern, the frequency selection transmission unit 102 uses the first transition pattern for transmitting different signals (for example, packets including different data portions) to the slave S1-X in series and for receiving signals of the replies from the slave S1-X. In this way, the master M1 can continuously communicate with the slave S1-X with the good first transition pattern in which interference with the ether wireless communication systems is less.

However, in some cases, the reception demodulation unit 103 cannot receive the second signal from the slave S1-X at the first frequency band after the frequency selection transmission unit 102 transmits the first signal. The reception demodulation unit 103 cannot receive the second signal from the slave S1-X at the first frequency band for one of the following two reasons.

As the first reason, when the transmitted first signal did not reach the slave S1-X because of interference, and thus, the reception demodulation unit 202 of the slave S1-X did not receive the first signal, the transmission unit 203 did not transmit the second signal for a reply to the master M1. As the second reason, although the first signal reached the slave S1-X, and the reception demodulation unit 202 of the slave S1-X received the first signal, the second signal transmitted by the transmission unit 203 for a reply did not reach the master M1. For one of these two reasons, after the frequency selection transmission unit 102 transmits the first signal, the reception demodulation unit 103 cannot receive the second signal from the slave S1-X at the first frequency band.

When the reception demodulation unit 103 does not receive the second signal from the slave S1-X at the first frequency band after the frequency selection transmission unit 102 transmits the first signal at the first frequency band, the packet collision detection unit 104 detects interference with another wireless communication system (for example, packet collision). In this case, the frequency selection transmission unit 102 transmits (retransmits) the first signal to the slave S1-X at the second frequency band. As described above, the second frequency band is a frequency band which is included in the first transition pattern and should be used after the first frequency band.

The packet collision detection unit 104 may detect interference with another wireless communication system (for example, packet collision) when the second signal is not received from the slave S1-X at the first frequency band ever, after the elapse of a hopping interval from the transmission of the first signal by the frequency selection transmission unit 102 at the first frequency band. The frequency selection transmission unit 102 may change the frequency band to be used for communication with the slave S1-X at each hopping interval. The hopping interval is, for example, a value obtained by dividing the maximum allowed delay time by an integer.

The packet, collision detection unit 104 further detects interference with another wireless communication system when a third signal is not received from the slave S1-X at the second frequency band after the frequency selection transmission unit 102 transmits the first signal at the second frequency band. In this case, the frequency selection transmission unit 102 transmits the first signal to the slave S1-X at a third frequency band. As described above, the third frequency band is the initial frequency band included in the second transition pattern. The packet collision detection unit 104 may detect interference with another wireless communication system when the third signal is not received from the slave S1-X at the second frequency band even after the elapse of the hopping interval from the transmission of the first signal by the frequency selection transmission unit 102 at the second frequency band.

The packet collision detection unit 104 may detect that a signal was not received from the slave S1-X successively at the frequency band of the first transition pattern for more than the maximum allowed delay time after the start of the transmission of the first signal with the first transition pattern. For example, the packet collision detection unit 104 counts the successive number of times in which a signal was not received from the slave S1-X at the frequency band of the first transition pattern after the start of the transmission of the first signal with the first transition pattern. In this case, when the counted number of times exceeds the number of times in which a signal can be transmitted within the maximum allowed delay rime (=maximum allowed delay time/hopping interval), the packet collision detection unit 104 may determine that a signal was not received from the slave S1-X successively at the frequency band of the first transition pattern for more than the maximum allowed delay time after the start of the transmission of the first signal with the first transition pattern.

Further, the slave S1-X may transmit data known in the master M1, and the packet collision detection unit 104 may calculate the error rate of the data received from the slave S1-X. In this case, when the calculated error rate exceeds a threshold, the packet collision detection unit 104 determines that a signal was not received from the slave S1-X successively at the frequency band of the first transition pattern for more than the maximum allowed delay time after the start of the transmission of the first signal with the first transition pattern.

When a signal was not received from the slave S1-X successively at the frequency band of the first transition pattern for more than the maximum allowed delay time after the start of the transmission of the first signal with the first transition pattern, the reconfiguration unit 105 switches the frequency selection transmission unit 102 so as to transmit a signal to the slave S1-X with the second transition pattern different from the first transition pattern. In other words, the reconfiguration unit 105 determines that the first transition pattern is a bad transition pattern in which the frequency of interference with the other wireless communication systems is high. In response to the switching by the reconfiguration unit 105, the frequency selection transmission unit 102 transmits the first signal to the slave S1-X at the third frequency band indicated in the second transition pattern. At this time, after the reconfiguration unit 105 randomly selects the second parameter, the frequency selection transmission unit 102 may determine the second transition pattern using the first method with the second parameter.

When both a signal from the master M1 to the slave S1-X and a signal from the slave S1-X to the master M1 reach the respective destinations at the frequency band transitioning in accordance with the second transition pattern, the frequency selection transmission unit 102 uses the second transition pattern for transmitting different signals to the slave S1-X in series and for receiving signals of the replies from the slave S1-X. Thus, the master M1 can continuously communicate with the slave S1-X with the good second transition pattern in which interference with the other wireless communication systems is less.

The frequency selection transmission unit 102, the packet collision detection unit 104 and the reconfiguration unit 105 repeat the above operation for each of the slaves S1-1, S1-2, . . . , S1-N until a good transition pattern is selected. In this manner, the master M1 can communicate with each of the slaves S1-1, S1-2, . . . , S1-N with a transition pattern in which interference with the other wireless communication systems is reduced.

<Wireless Communication Between Master and Slave>

Figure 3:
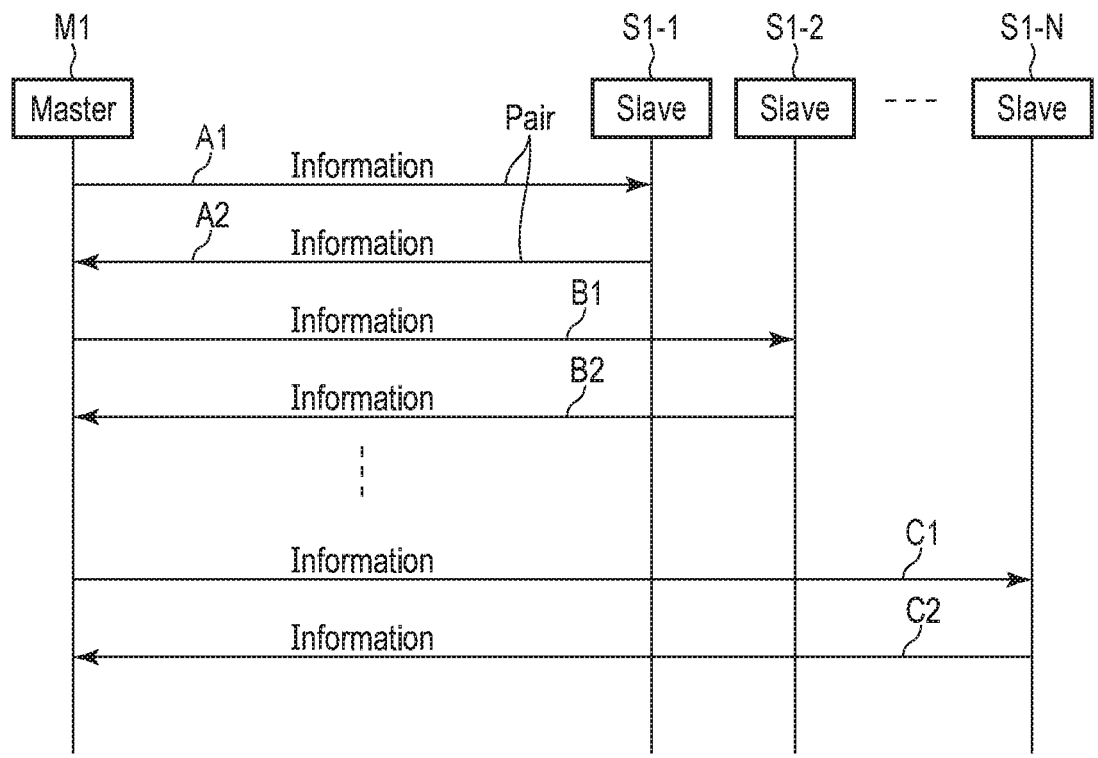
FIG. 3 is a diagram illustrating an example of the communication sequence between a master and multiple slaves.

FIG. 3 illustrates an example of the communication sequence between the master M1 and the slaves S1-1, S1-2, ..., S1-N. When the master M1 and the slaves S1-1, S1-2, ..., S1-N perform wireless communication conformable to, for example, BLE, the transmission of information from the master M1 to a slave and the transmission of information from the slave to the master M1 are paired.

More specifically, as illustrated in FIG. 3, transmission A1 of information from the master M1 to the slave S1-1 and transmission A2 of information from the slave S1-1 to the master M1 are paired. Transmission B1 of information from the master M1 to the slave S1-2 and transmission B2 of information from the slave S1-2 to the master M1 are paired. Transmission C1 of information from the master M1 to the slave S1-N and transmission C2 of information from the slave S1-N to the master M1 are paired.

Thus, in the wireless communication system 5-1, the number of pairs between the transmission of information from the master M1 to a slave and the transmission of information from the slave to the master M1 may correspond to the number of slaves connected to the master M1.

Figure 4:
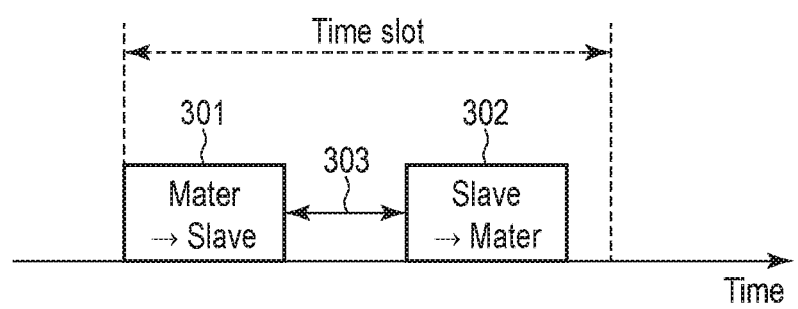
FIG. 4 is a diagram illustrating an example in which packets are exchanged between a master and a slave.

FIG. 4 illustrates an example of exchange of packets to realize the pair of the transmission of information from the master M1 to the slave S1-X and the transmission of information from the slave S1-X to the master M1. In the example illustrated in FIG. 4, a packet 301 is transmitted at a time point from the master M1 to the slave S1-X. At the time point when a certain time 303 has passed after the completion of the transmission of the packet 301, a packet 302 is transmitted (replied) from the slave S1-X to the master M1. The transmission of the packet 301 from the master M1 to the slave S1-X and the transmission of the packet 302 from the slave S1-X to the master M1 may be performed in a period called a time slot.

The packet 301 includes information to be transmitted from the master M1 to the slave S1-X. The packet 301 includes, for example, information indicative of a request of the master M1 for the slave S1-X. The packet 302 includes information for replying to the packet 301. The packet 302 includes, for example, ACK, and information which is managed by the master M1 and is related to the slave S1-X.

FIG. 5 further illustrates an example in which packets are exchanged between the master M1 and the slave S1-X in a specific time slot at a specific partial frequency band. The master M1 may use partial frequency bands, which are obtained by evenly dividing a frequency band available for the wireless communication, for communication with each of the slaves S1-1, S1-2, ..., S1-N. The partial frequency bands may be called channels.

In the example of FIG. 5, in a time slot 311, the master M1 transmits a packet to the slave S1-X at a channel 312, the slave S1-X then transmits a packet to the master M1 at the channel 312. Thus, in the single time slot 311, the transmission of a packet from the master M1 to the slave S1-X and the transmission of a packet from the slave S1-X to the master M1 in response to the transmission of the packet from the master M1 to the slave S1-X are performed, using the same channel 312. In other words, the single time slot 311 and the single channel 312 are allocated for the transmission of a packet from the master M1 to the slave S1-X and the transmission of a packet from the slave S1-X to the master M1 in response to the transmission of the packet from the master M1 to the slave S1-X.

<Frequency Hopping>

When the slaves S1-1, S1-2, ..., S1-N are connected to the master M1, the master M1 uses, for example, frequency hopping, to allocate a channel for the communication with each of the slaves S1-1, S1-2, ..., S1-N. In frequency hopping, the channel allocated for the communication with each of the slaves S1-1, S1-2, ..., S1-N periodically changes as time passes.

More specifically, in frequency hopping, when connection between the master M1 and the slave S1-X is established, channels which hops at a certain frequency interval are allocated in series for communication with the slave S1-X. The master M1 allocates a channel to be used for the communication with the slave S1-X such that the channel periodically changes (hops) as time passes, by using frequency hopping.

Hereinafter, the frequency interval used in frequency hopping is called a HopIncrement. As the HopIncrement, a value determined for each of the slaves S1-1, S1-2, ..., S1-N may be used. For example, a value in units of a channel is set as the HopIncrement.

The master M1 determines the channel to be used for the communication with the slave S1-X in series as time passes after connection with the slave S1-X is established through the state of advertisement. As described above, in frequency hopping, the channel allocated for the communication with the slave S1-X periodically changes as time passes. For example, the master M1 determines the channel to be allocated for the communication with each of the slaves S1-1, S1-2, ..., S1-N, on the basis of the following equation (1) defined in BLE:

$$\text{UnmappedChannel} = (\text{LastUnmappedChannel} + \text{HopIncrement}) \bmod 37 \quad \text{Equation (1)}.$$

The UnmappedChannel indicates the channel (more specifically, the channel index) to be allocated for the communication with the slave S1-X. The LastUnmappedChannel indicates the channel (channel index) allocated for the previous communication with the slave S1-X. When the UnmappedChannel is firstly calculated after the connection between the master M1 and the slave S1-X is established, 0 is set as the LastUnmappedChannel.

The HopIncrement indicates a frequency interval in units of a channel between two channels. One of the two channels is changed to the ether of the two channels by hopping of the HopIncrement. The HopIncrement is a parameter used in frequency hopping and randomly determined. In response to the establishment of the connection with the slave S1-X, for example, the master M1 randomly selects one of the integers from 5 to 16 and uses it as the HopIncrement corresponding to the slave S1-X.

In equation (1), the remainder obtained by dividing the sum of the LastUnmappedChannel and the HopIncrement by 37 is calculated as the UnmappedChannel. The master M1 can allocate a time-series transition pattern of channels having randomness and periodicity for the connected slave S1-X by applying the HopIncrement, which is randomly selected, to equation (1).

Equation (1) assumes that 37 channels are available for communication between the master M1 and the slaves S1-1, S1-2, ..., S1-N. The number of available channels may be determined freely, and equation (1) can be appropriately changed in accordance with the number. Values which may be selected as the HopIncrement are not limited to the above integers from 5 to 16, and may be determined freely.

Figure 6:
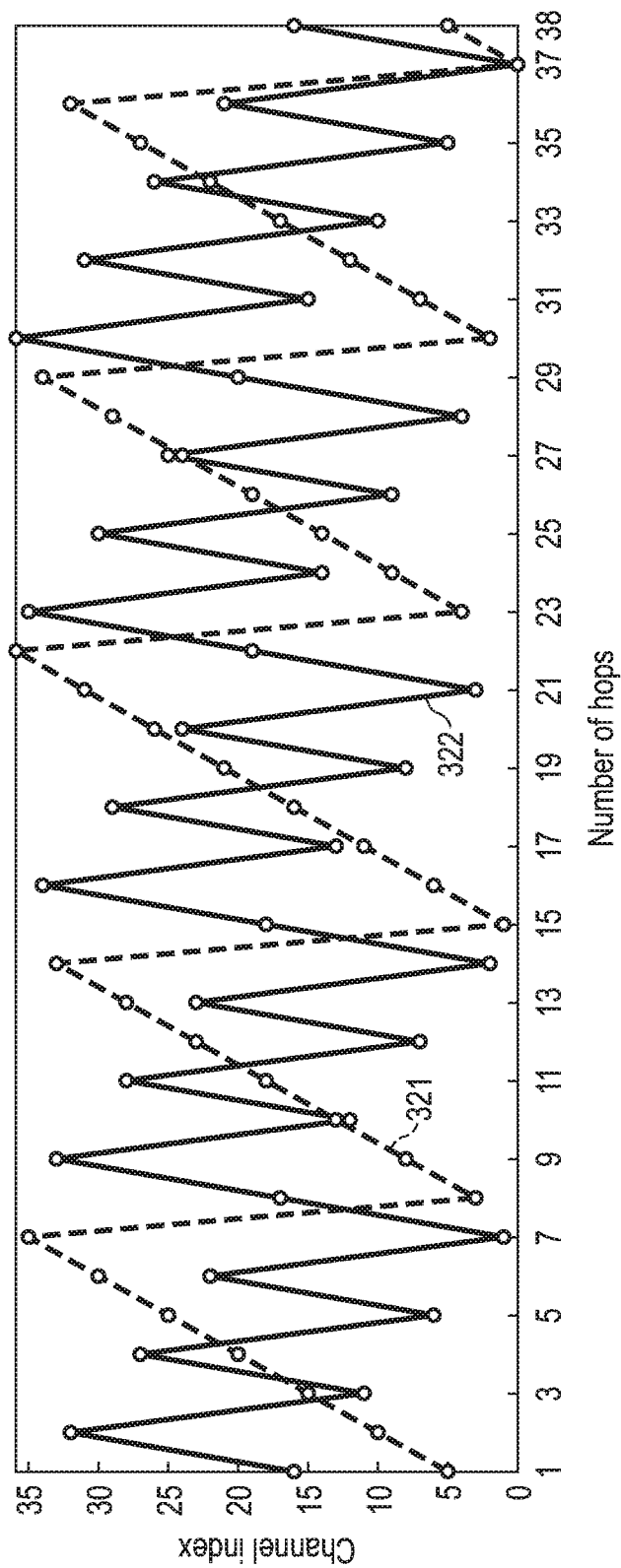
FIG. 6 is a diagram illustrating an example of the transition of channels allocated using frequency hopping.

FIG. 6 illustrates an example of the transition patterns of channels allocated using frequency hopping. More specifically, FIG. 6 illustrates a transition pattern 321 of channels allocated when the HopIncrement is 5 and a transition pattern 322 of channels allocated when the HopIncrement is 16 in accordance with equation (1). In FIG. 6, the horizontal axis indicates the number of hops, and the perpendicular axis indicates the channel index. Here, it is assumed that 37 channels from 0 to 36 are available for communication between the master M1 and the slaves S1-1, S1-2, ..., S1-N.

In each of the transition patterns 321 and 322 of channels, 37 hops correspond to a cycle. As illustrated by the transition patterns 321 and 322, when any value is used as the HopIncrement, the channel returns to the channel which is firstly allocated after passing through every channel once in the transition of channels in a cycle corresponding to 37 hops. For example, this is clear from the fact that the remainder obtained by adding the HopIncrement times and dividing it by 37 is 0. Thus, in static radio propagation circumstances, a communication property based on the transition pattern of channels, which are determined with 37 hops, is periodically repeated. The static radio propagation circumstances refer to, for example, circumstances in a space surrounded by metal and blocking radio waves.

Figure 7:
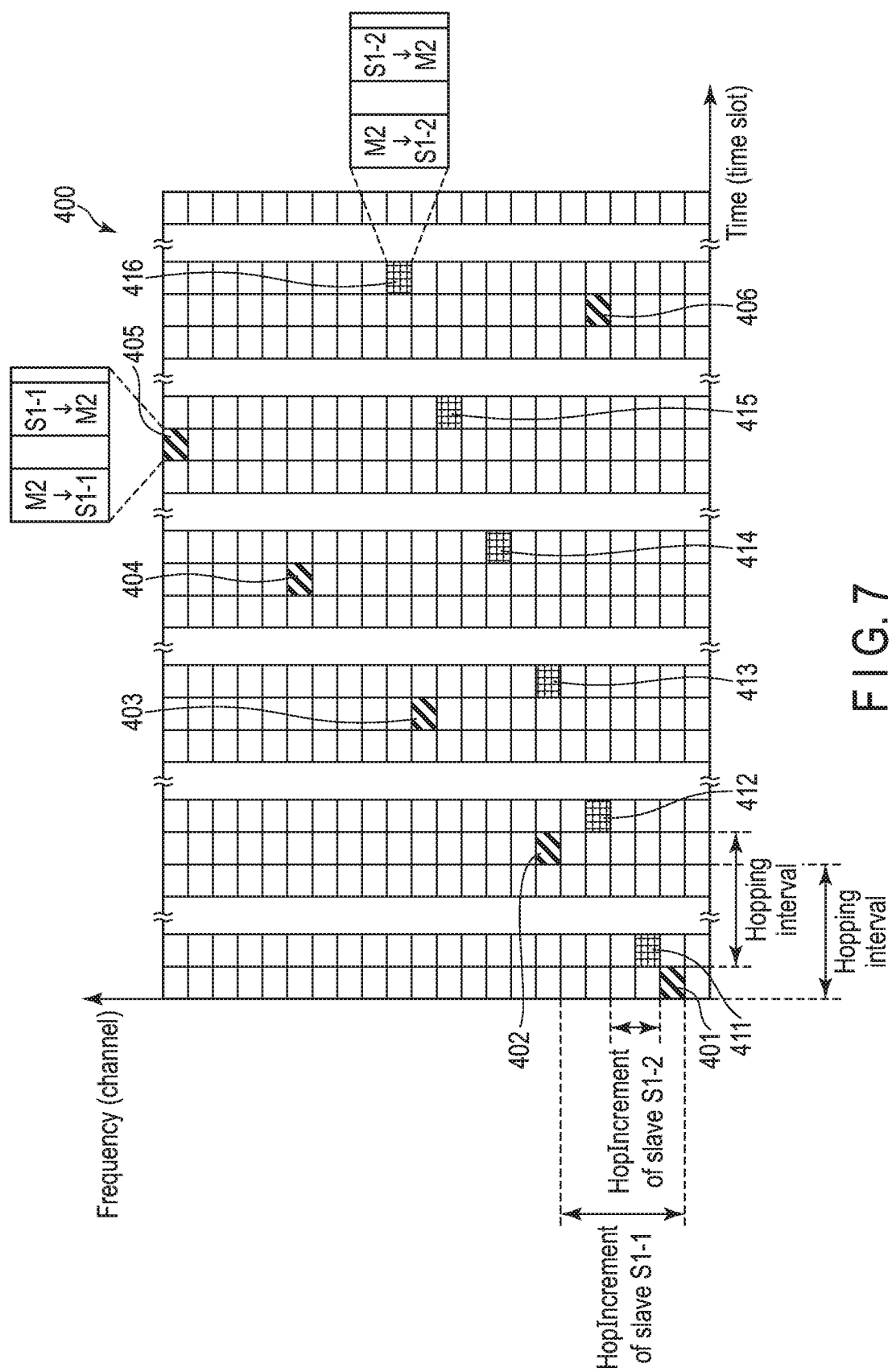
FIG. 7 is a diagram illustrating an example of the channel map in which a master allocates a combination of a time slot and a channel to each of two slaves.

FIG. 7 illustrates an example of a channel map 400 in which the master M1 allocates combinations of a time slot and a channel to each of two slaves S1-1 and S1-2 other words, to the link with each of the slaves S1-1 and S1-2). Here, it is assumed that 37 channels from 0 to 36 are available for communication between the master M1 and the slaves S1-1 and S1-2.

To each of the slaves S1-1 and S1-2, as time passes, the master M1 allocates a time slot at regular time intervals and allocates a channel by using the above frequency hopping. In other words, the master M1 allocates a combination of a time slot and a channel to each of the slaves S1-1 and S1-2 as time passes.

The allocation of a combination of a time slot and a channel to a slave indicates that the combination of the time slot and the channel is used for the communication (for example, the transmission and reception of packets) between the master M1 and the slave.

The regular time interval at which a combination of a channel and a time slot is allocated to each slave is called a hopping interval or connection interval. The master M1 may use a common value for the slaves S1-1, S1-2, ..., S1-N, as the hopping interval. The master M1 may use a value determined in advance as the hopping interval, or may set a certain value as the hopping interval in response to the first establishment of connection with a slave.

In the channel map 400, time-frequency regions 401 to 406 illustrated with the hatch pattern indicate the combinations of the time slot and the channel allocated to the slave S1-1 in order. Time-frequency regions 411 to 416 illustrated with the grating pattern indicate the combinations of the time slot and the channel allocated to the slave S1-2 in order. Hereinafter, a time-frequency region may be simply called a region.

In the example illustrated in FIG. 7, the HopIncrement for the slave S1-1 is 5. Thus, a frequency interval of five channels is present between two channels successively allocated to the slave S1-1. For example, a frequency interval of five channels is present between the region 401 and the region 402.

The HopIncrement for the slave S1-2 is 2. Thus, a frequency interval of two channels present between two channels successively allocated to the slave S1-2. For example, a frequency interval of two channels is present between the region 411 and the region 412.

As stated above, a common hopping interval is used for the slaves S1-1 and S1-2. Thus, the interval of two time slots successively allocated to the slave S1-1 corresponds to the hopping interval. The interval of two time slots successively allocated to the slave S1-2 corresponds to the hopping interval. For example, the interval between the region 401 and the region 402 corresponds to the hopping interval. The interval between the region 411 and the region 412 corresponds to the hopping interval.

As explained above with reference to FIG. 4, each of the regions 401 to 406 allocated to the slave S1-1 indicates that a packet is transmitted from the master M1 to the slave S1-1 and subsequently a packet is transmitted from the slave S1-1 to the master M1 in a time slot corresponding to the region at a channel corresponding to the region. Similarly, each of the regions 411 to 416 allocated to the slave S1-2 indicates that a packet is transmitted from the master M1 to the slave S1-2 and subsequently a packet is transmitted from the slave S1-2 to the master M1 in a time slot corresponding to the region at a channel corresponding to the region.

In the example of FIG. 7, the HopIncrement corresponding to the slave S1-1 is 5, and the HopIncrement corresponding to slave S1-2 is 2, and thus, the HopIncrements corresponding to the two slaves S1-1 and S1-2 are different from each other. However, a HopIncrement corresponding to the slave S1-1 and a HopIncrement corresponding to the slave S1-2 are randomly selected, respectively. Therefore, in some cases, they are the same as each other.

As illustrated in FIG. 7, the master M1 allocates different time slots to the slaves S1-1 and S1-2. Thus, even if the seine value is selected as HopIncrements corresponding to the two slaves S1-1 and S1-2, interference is not caused between the communication between the master M1 and the slave S1-1 and the communication between the master M1 and the slave S1-2.

Figure 8:
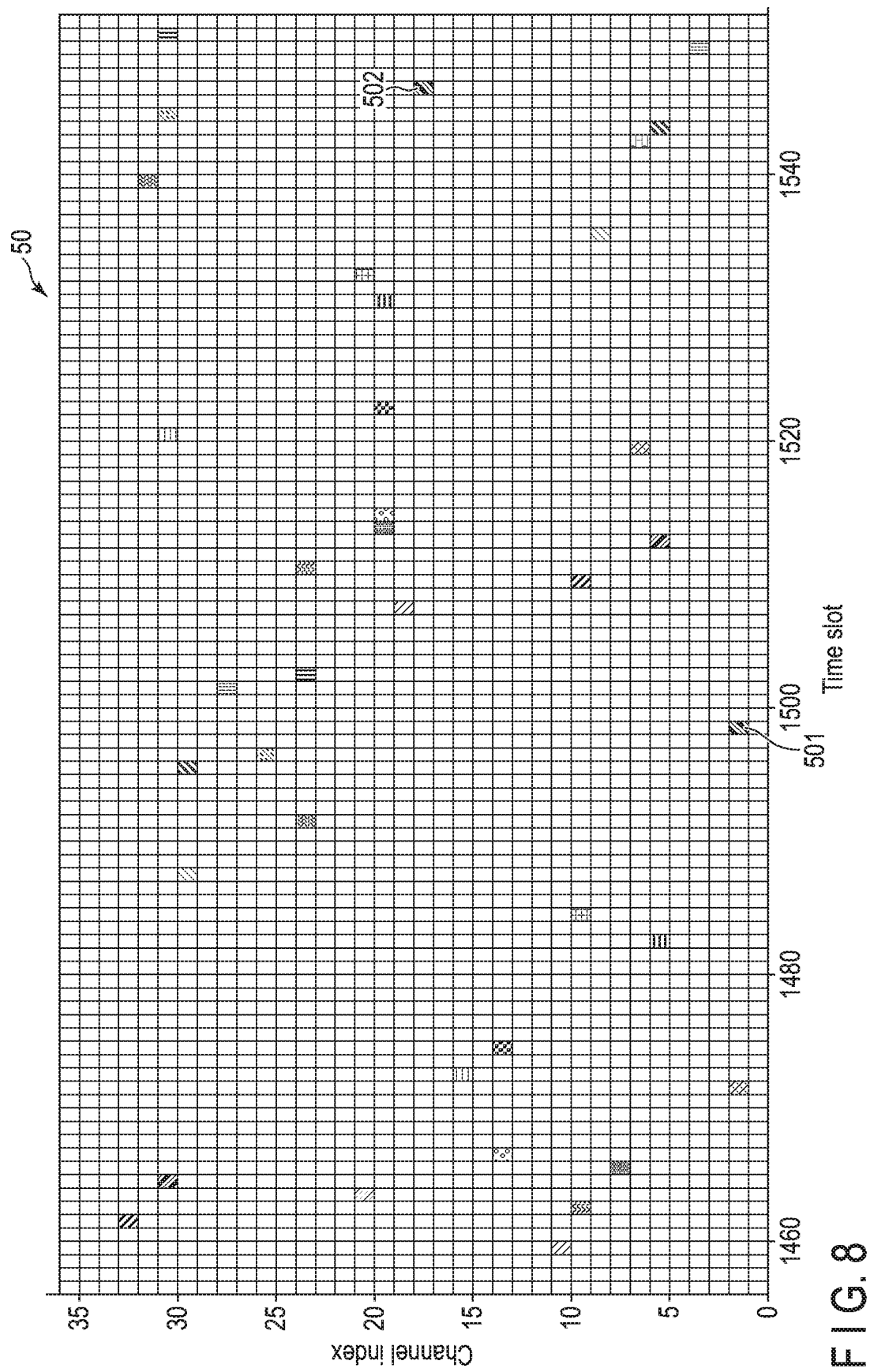
FIG. 8 is a diagram illustrating an example of the channel map in which a master allocates a combination of a time slot and a channel to each of 20 slaves.

FIG. 8 illustrates an example of a channel map 50 in which the master M1 allocates combinations of a time slot and a channel to each of 20 slaves. Here, it is assumed that 37 channels from 0 to 36 are available for communication between the master M1 and the 20 slaves.

In the channel map 50, a large number of regions indicative of the combinations of the time slots and the channels allocated to the 20 slaves are illustrated with patterns which differ depending on the slave. For example, the channel map 50 indicates that, to the slave S1-X, the combination of the time slot and the channel indicated by a region 501 is allocated, and subsequently, the combination of the time slot and the channel indicated by a region 502 is allocated.

As described above, the master M1 randomly determines the value of the HopIncrement in response to the establishment of the connection with the slave S1-X. The master M1 uses, as the starting point, a time slot which does not overlap the time slots allocated to the other slaves. On the basis of the starting point, the master M1 allocates a time slot for each hopping interval to the slave S1-X in series, and allocates a channel to the slave S1-X in series by frequency hopping using the HopIncrement randomly determined. The master M1 starts allocation every time connection with each slave is established. When the connection with the slave is cancelled, the master M1 terminates the allocation.

Thus, the allocation of a combination of a time slot and a channel to each of the 20 slaves is not scheduled in advance. For this reason, as illustrated in FIG. 8, an empty time slot which is not allocated to any slave may be present.

<Communication in Multiple Wireless Communication Systems>

Figure 9:
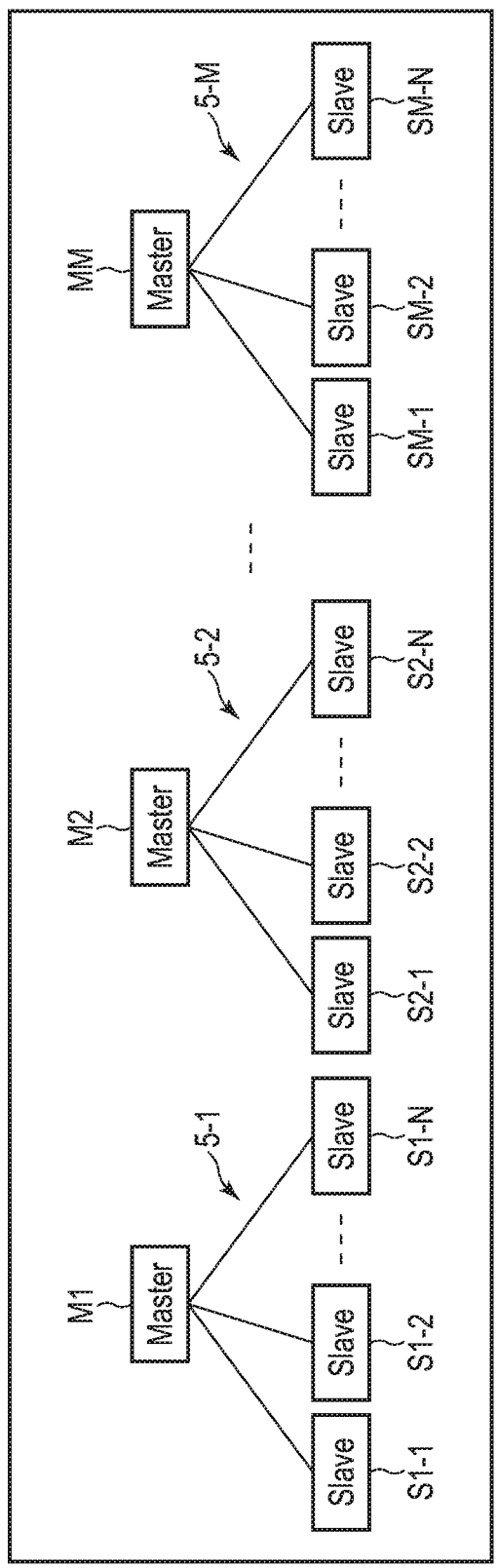
FIG. 9 is a block diagram illustrating a configuration example of multiple wireless communication systems including the wireless communication system of FIG. 1.

FIG. 9 illustrates a configuration example of multiple wireless communication systems including the wireless communication system 5-1. Here, this specification exemplifies a case where M wireless communication systems 5-1, 5-2, . . . , 5-M are provided. The frequency bands used for communication in the wireless communication systems 5-1, 5-2, . . . , 5-M at least partially overlap with each other.

As explained above with reference to FIG. 1, the wireless communication system 5-1 is composed of the single master M1 and the N slaves S1-1, S1-2, . . . , S1-N. The wireless communication system 5-2 is composed of a master M2 and N slaves S2-1, S2-2, . . . , S2-N. The wireless communication system 5-M is composed of a master MM and N slaves SM-1, SM-2, . . . , SM-N. The number of slaves that are provided in each of the wireless communication systems 5-1, 5-2, . . . , 5-M is freely determined. The number of slaves may differ depending on the wireless communication system.

The operation of the wireless communication system 5-1 is as described above. The other wireless communication systems 5-2, . . . , 5-M operate in the same manner as the wireless communication system 5-1.

In each of the wireless communication systems 5-1, 5-2, . . . , 5-M, since a combination of a time slot and a channel is allocated to each slave as explained above with reference to FIG. 7 and FIG. 8, interference is not caused in communication between the master and each of the slaves.

Figure 10:
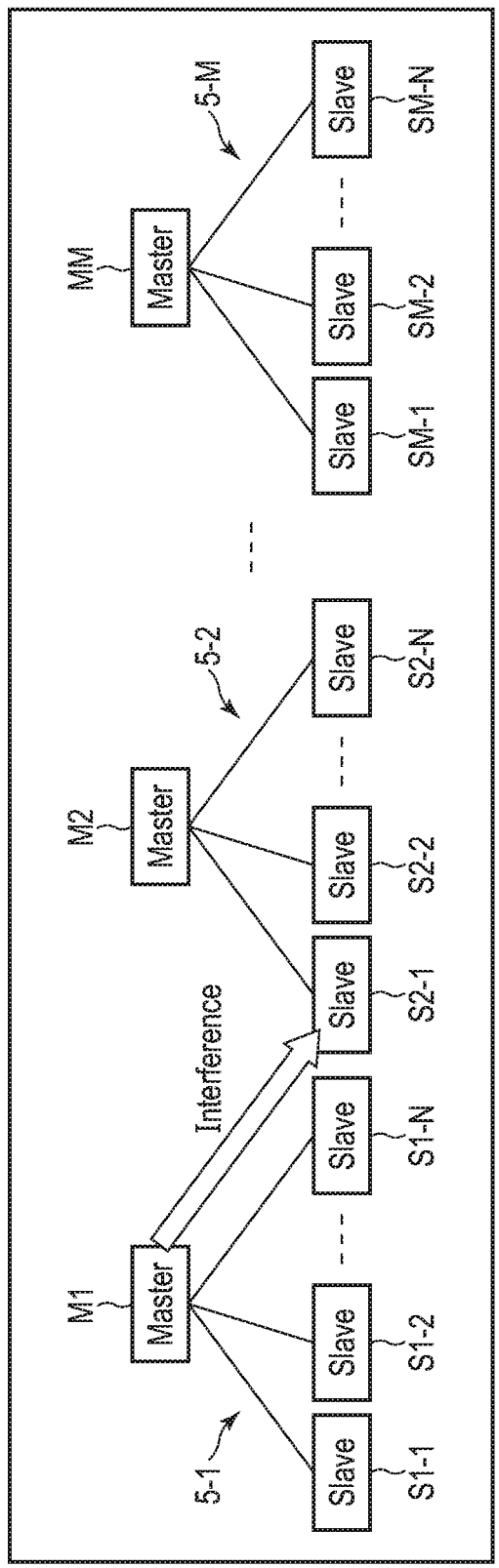
FIG. 10 is a diagram illustrating an example in which a wireless communication system interferes with another wireless communication system in the wireless communication systems of FIG. 9.

However, as illustrated in FIG. 10, interference may be caused among the wireless communication systems 5-1, 5-2, . . . , 5-M. For example, when a combination of a time slot and a channel used for communication between the master M1 and the slave S1-N overlaps a combination of a time slot and a channel used for communication between the master M2 and the slave S2-1, interference is caused. Here, it is assumed that the wireless communication systems 5-1, 5-2, . . . , 5-M perform communication conformable to BLE. When at least a part of the frequency bands used for communication among multiple wireless communication systems each comprising a master and multiple slaves overlaps, similar interference may be caused.

Figure 11:
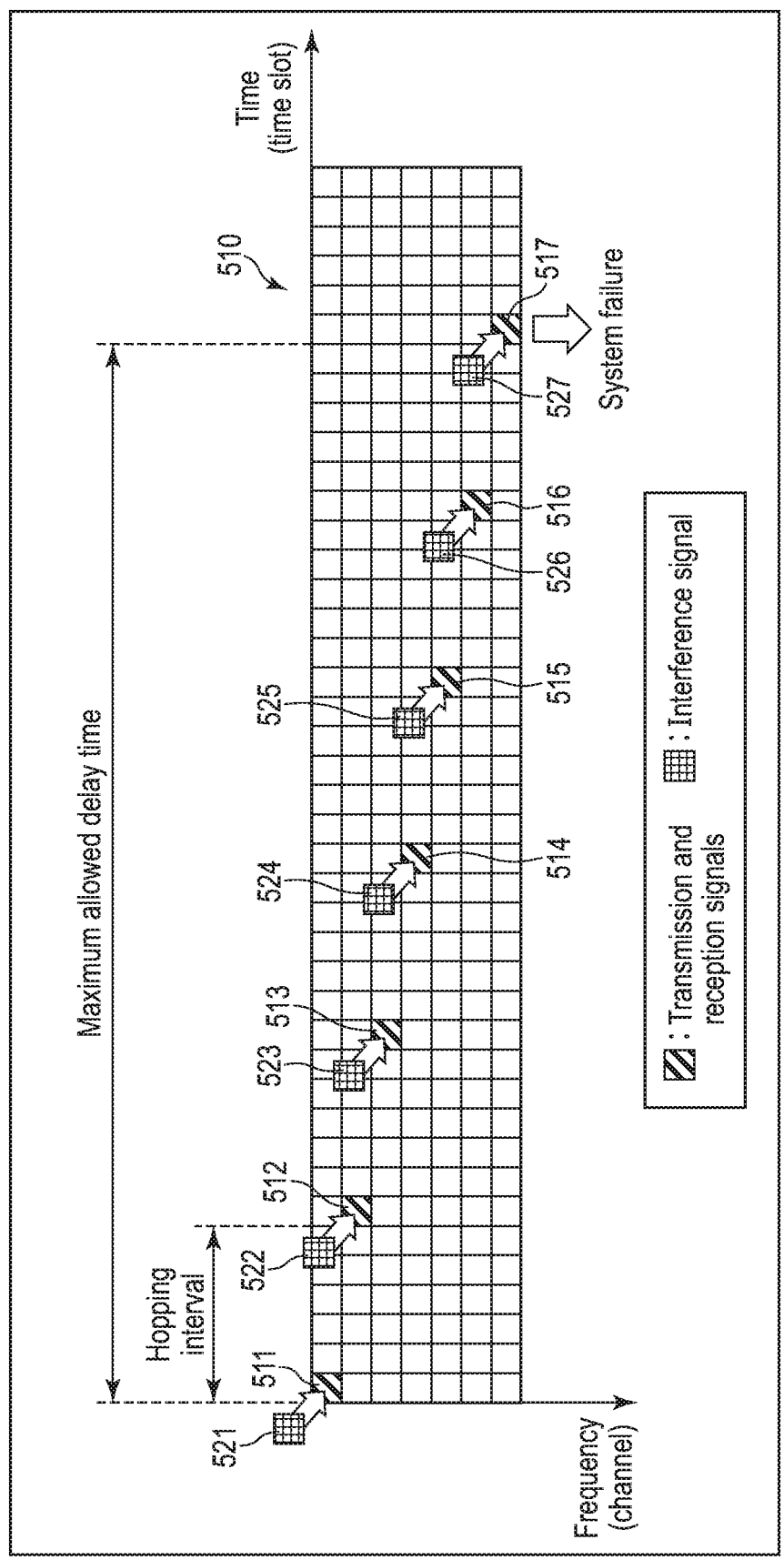
FIG. 11 is a diagram illustrating an example in which a system failure occurs in a wireless communication system because of interference.

FIG. 11 illustrates an example of a channel map 510 in a case where a system failure occurs in the wireless communication system 5-1 because of interference. Here, it is assumed that the master M1 communicates with the slave S1-X in the wireless communication system 5-1.

In the channel map 510, time-frequency regions 511 to 517 illustrated with the hatch pattern indicate combinations of a time slot and a channel allocated to the slave S1-X in order. The signals to be transmitted and received between the master M1 and slave S1-X are transferred, using the combination of the time slot and the channel indicated by each of the regions 511 to 517.

Each of time-frequency regions 521 to 527 illustrated with the grating pattern indicates the combination of the time slot and the channel allocated in the other wireless communication systems 5-2, . . . , 5-M. These regions 521 to 527 indicate the same combinations of the time slot and the channel as the above regions 511 to 517, respectively. Thus, the signals transferred using the combination of the time slot and the channel indicated by each of the regions 521 to 527 in the other wireless communication systems 5-2, . . . , 5-M interfere with the signals transmitted and received between the master M1 and the slave S1-X.

More specifically, as shown by the regions 511 to 517, the master M1 communicates with the slave S1-X with the transition pattern of the channel changing (hopping) at hopping intervals. However, if communication is performed at the same time points with the same transition pattern of channels in one of the other wireless communication systems 5-2, . . . , 5-M as shown by the regions 521 to 527, collision of a transferred packet repeatedly occurs between the two wireless communication systems.

In the master M1, if successive packet collisions occur beyond the maximum allowed delay time in the transmission of a packet with respect to the slave S1-X, the connection with the slave S1-X is lost, and a system failure occurs. As stated above, the maximum allowed delay time is the maximum time of delay which is allowed at the time of transmitting a packet. As the maximum allowed delay time, for example, a time of an integral multiple of the hopping interval (in FIG. 11, six times) is set.

Figure 12:
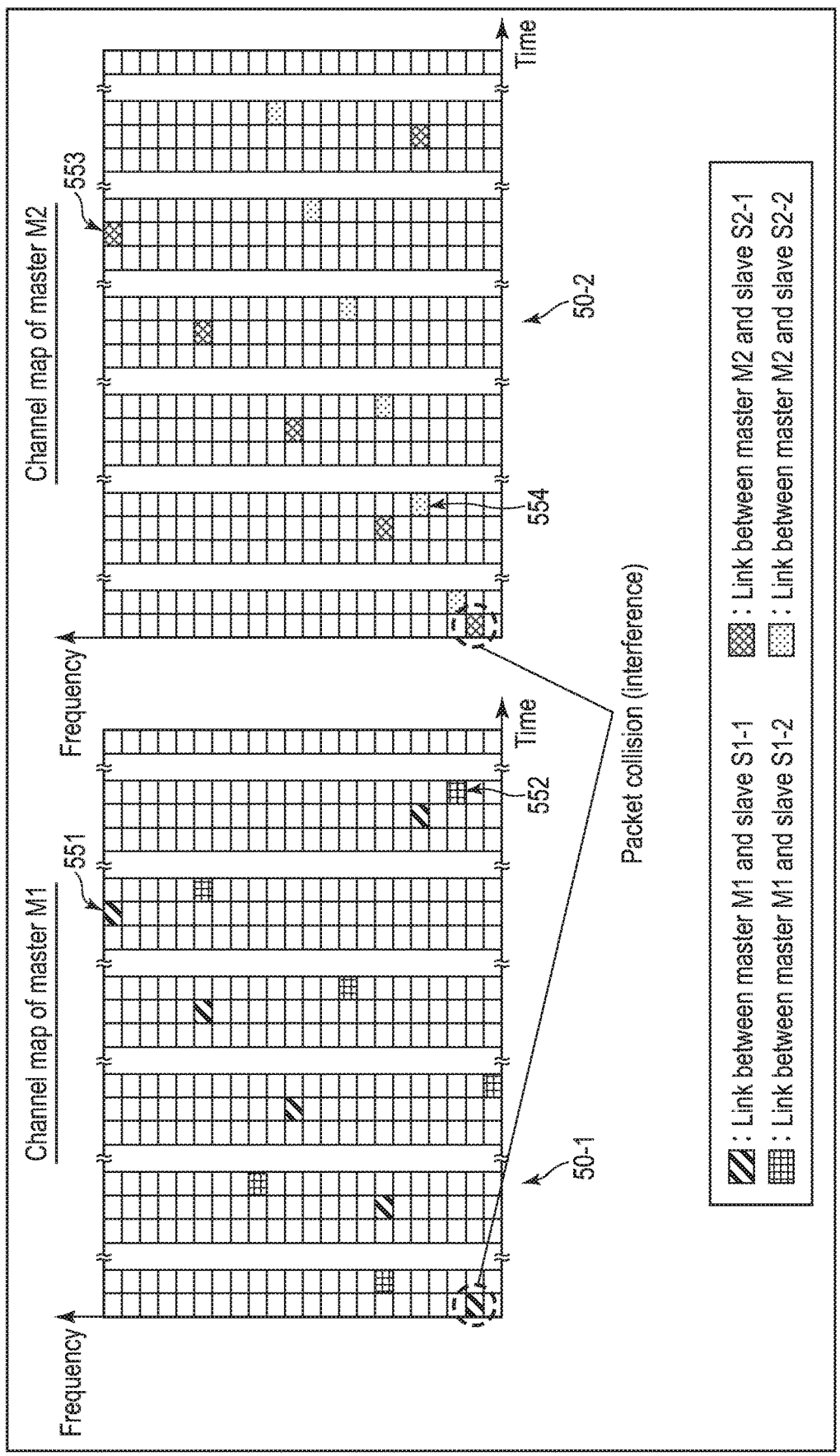
FIG. 12 is a diagram illustrating an example of the channel maps in a case where packet collision continues to occur between the wireless communication system of FIG. 1 and another wireless communication system.
Figure 13:
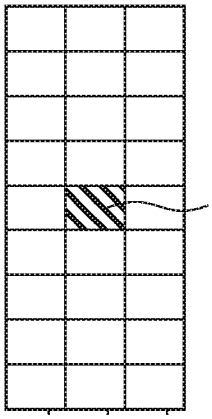
FIG. 13 is a diagram illustrating an example of the pattern of the time and frequency in which interference is caused.

FIG. 12 illustrates an example of channel maps in a case where packet collision continues to occur between the two wireless communication systems 5-1 and 5-2. In a channel map 50-1 of the master M1, frequency-time regions 551 allocated to the slave S1-1 (in other words, to the link between the master M1 and the slave S1-1) and frequency-time regions 552 allocated to the slave S1-2 (in other words, to the link between the master M1 and the slave S1-2) are illustrated with different patterns. Similarly, in a channel map 50-2 of the master M2, frequency-time regions 553 allocated to the slave S2-1 and frequency-time regions 554 allocated to the slave S2-2 are illustrated patterns different from each other and further different from the patterns of the regions 551 and 552.

In a manner similar to that of FIG. 7, each frequency-time region illustrated with a pattern indicates the combination of the time slot and the channel allocated to a corresponding slave. The frequency-time regions 551 allocated to the slave S1-1 indicate the time-series transition pattern of the channels allocated to the slave S1-1. The frequency-time regions 552 allocated to the slave S1-2 indicate the time-series transition pattern of the channels allocated to the slave S1-2. The frequency-time regions 553 allocated to the slave S2-1 indicate the time-series transition pattern of the channels allocated to the slave S2-1. The frequency-time regions 554 allocated to the slave S2-2 indicate the time-series transition pattern of the channels allocated to the slave S2-2.

Since the time-series transition pattern of the channels corresponding to the slave S1-2 (equivalent to the frequency-time regions 552) does not overlap the time-series transition patterns of the channels corresponding to the slaves S2-1 and S2-2 in the other wireless communication system 5-2, packet collision (interference) does not occur in the communication between the master M1 and the slave S1-2. Similarly, since the time-series transition pattern of the channels corresponding to the slave S2-2 (equivalent to the frequency-time regions 554) does not overlap the time-series transition patterns of the channels corresponding to the slaves S1-1 and S1-2 in the other wireless communication system 5-1, packet collision does not occur in the communication between the master M2 and the slave S2-2.

However, since the time-series transition pattern of the channels corresponding to the slave S1-1 (equivalent to the frequency-time regions 551) overlaps the time-series transition pattern of the channels corresponding to the slaves S2-1 (equivalent to the frequency-time regions 553) in the other wireless communication system 5-2, packet collision repeatedly occurs between the communication between the master M1 and the slave S1-1 and the communication between the master M2 and the slave S2-1. In other words, since the time-series transition pattern of the channels corresponding to the slave S1-1 and the time-series transition pattern of the channels corresponding to the slave S2-1 occupy the same combinations of the time slot and the channel, packet collision repeatedly occurs.

In practice, in some cases, time slots of the same timing are not defined among the masters M1, M2, ..., MM, and instead, time slots of different timings are defined among the masters M1, M2, ..., MM. For example, there is a possibility that a time point is the starting time point of a time slot in the master M1 while the time point is the middle time point of a time slot, in the master M2.

Further, in consideration of a spectrum mask, there is a possibility that, communication using a channel has an influence on communication using an adjacent channel as well as communication using the channel.

Figure 33:
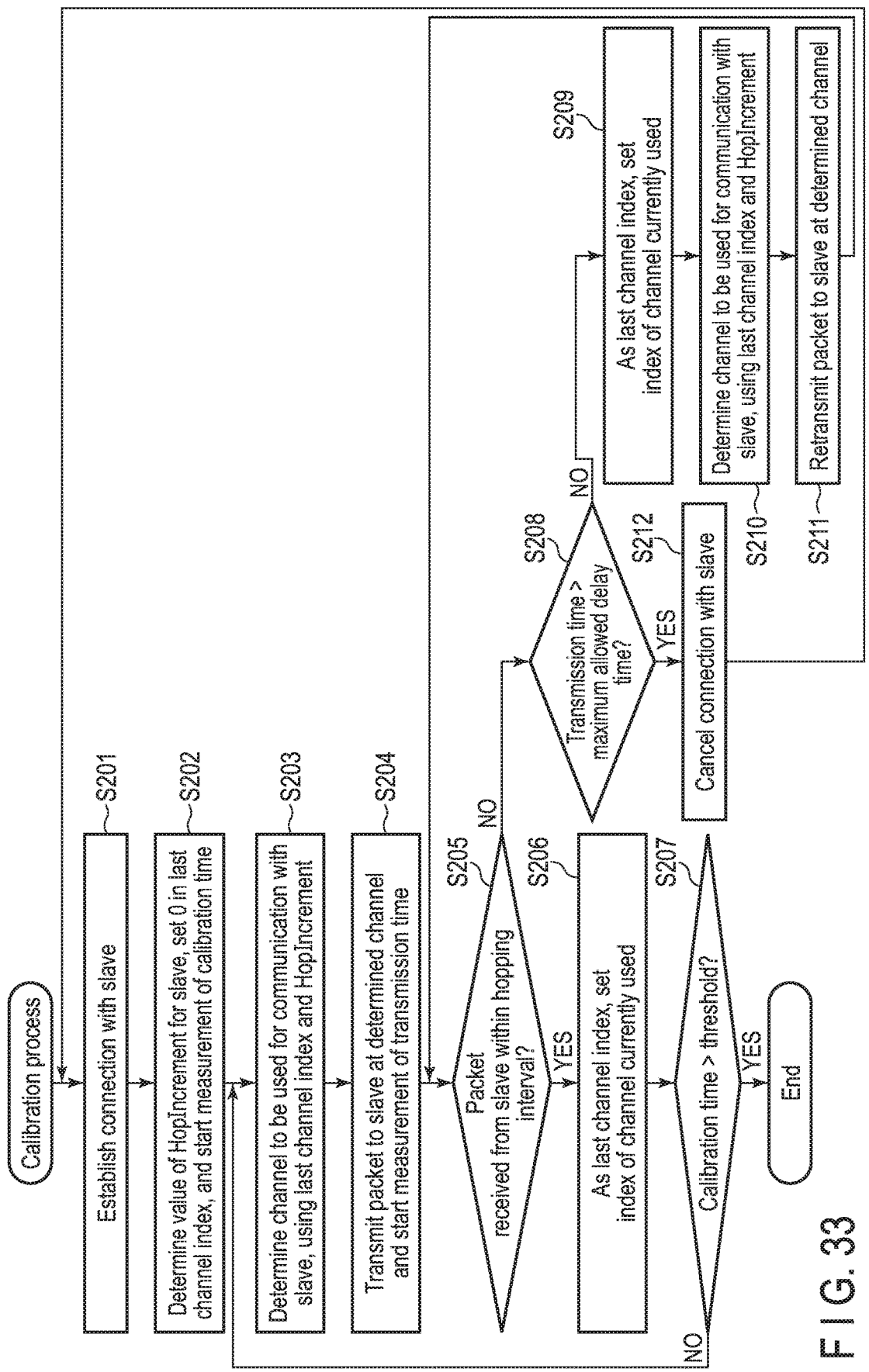
FIG. 33 is a flowchart illustrating an example of the procedure for a calibration process performed by a master.

FIG. 33 illustrates an example of the pattern of the time region and the frequency region in which interference is caused between the two wireless communication systems 5-1 and 5-2. Here, this specification explains an example in which packet collision occurs regarding each of the time region and the frequency region in a case where the master M1 communicates with a slave in a combination of a first time slot and a first channel corresponding to a time-frequency region 561.

Regarding the time region, when the master M2 communicates with a slave using two time-frequency regions 562 and 563 each corresponding to a combination of a time slot at least partially overlapping the first time slot and the first channel, packet collision may occur. In other words, packet collision may occur when the master M1 and the master M2 communicate with the respective slaves at the same channel and in time slots which at least partially overlap with each other.

Regarding the frequency region, in consideration of a spectrum mask, packet collision may occur when the master M2 communicates with a slave using (A) a time-frequency region 564 corresponding to the combination of the first time slot and the first channel, (B) a time-frequency region 565 corresponding to a combination of the first time slot and a channel adjacent to the first channel and having higher frequency or (C) a time-frequency region 566 corresponding to a combination of the first time slot and a channel adjacent to the first channel and having lower frequency. In other words, packet collision may occur when the master M1 and the master M2 communicate with the respective slaves in the same time slot and at the same channel or adjacent channels.

Thus, in consideration of both the time region and the frequency region, packet collision may occur when the master M1 and the master M2 communicate with the respective slaves in time slots which at least partially overlap with each other and at the same channel or adjacent channels.

Figure 14:
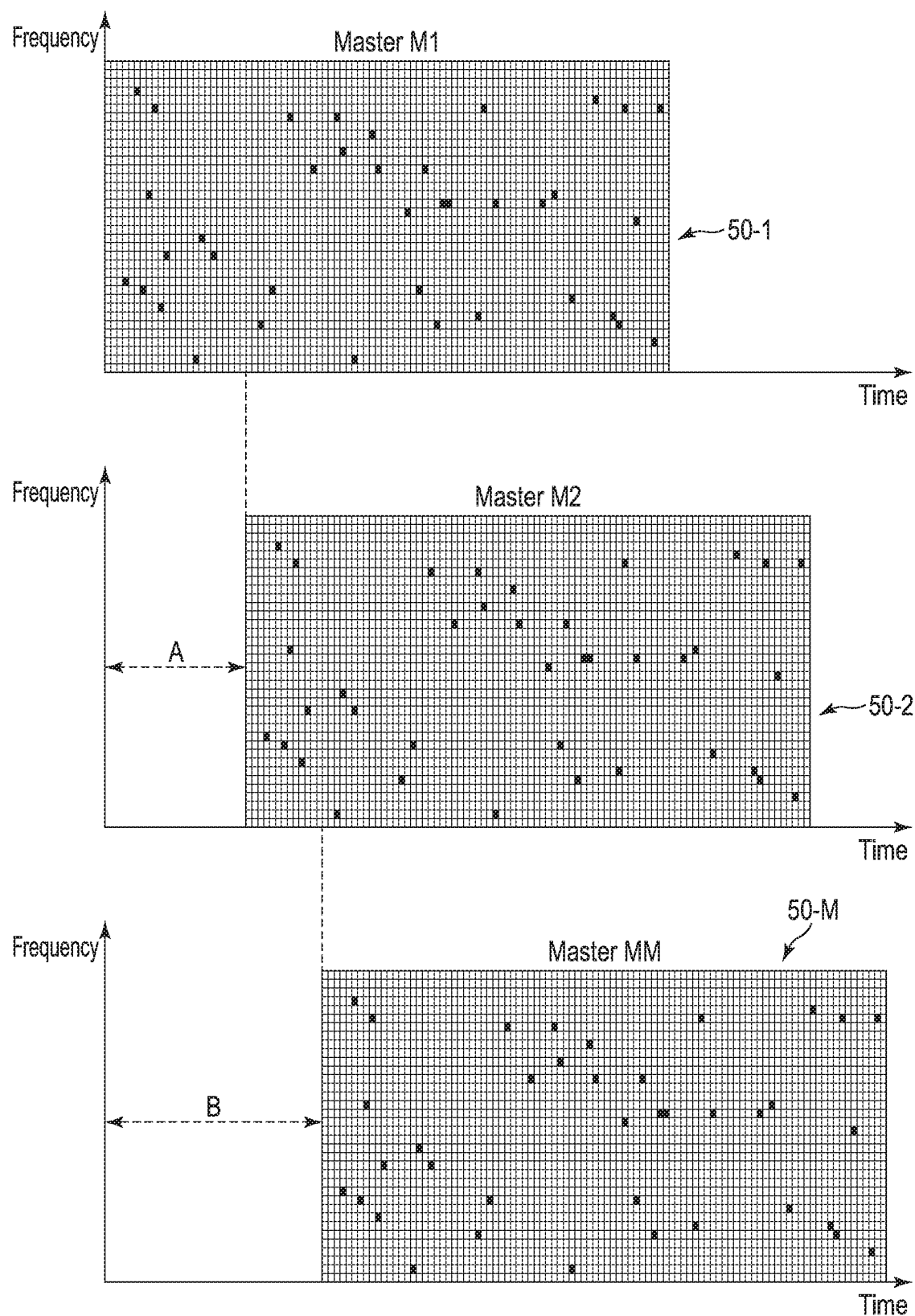
FIG. 14 is a diagram illustrating an example of the relationship of the channel maps of multiple wireless communication systems.

FIG. 14 illustrates an example of the relationship of channel maps 50-1, 50-2, ..., 50-M of the respective wireless communication systems 5-1, 5-2, ..., 5-M.

When the masters M1, M2, ..., MM in the wireless communication systems 5-1, 5-2, ..., 5-M operate, using the respective independent clocks, there is a possibility that a time difference A between the clock which is the basis of the master M1 and the clock which is the basis of master M2 changes, and a time difference B between the clock which is the basis of the master M1 and the clock which is the basis of master MM changes.

In contrast, when the masters M1, M2, ..., MM operate, using a common clock, neither the time difference A nor the time difference B changes. Even in a case where the masters M1, M2, ..., MM operate, using the respective independent clocks, if each clock is a high-performance clock having less fluctuation, the change in the time differences A and B is reduced.

In static circumstances where there is no change in the time differences A and B or the change is sufficiently small, a communication property regarding the occurrence of packet collision conforms to the time-series transition patterns of channels of the wireless communication systems 5-1, 5-2, ..., 5-M (that is, the patterns of the channel maps 50-1, 50-2, ..., 50-M). Since each of the time-series transition patterns of channels is periodically repeated, for example, for each cycle of 37 frequency hops, the communication property is maintained among the wireless communication systems 5-1, 5-2, ..., 5-M.

<Synchronization Among Masters>

Figure 15:
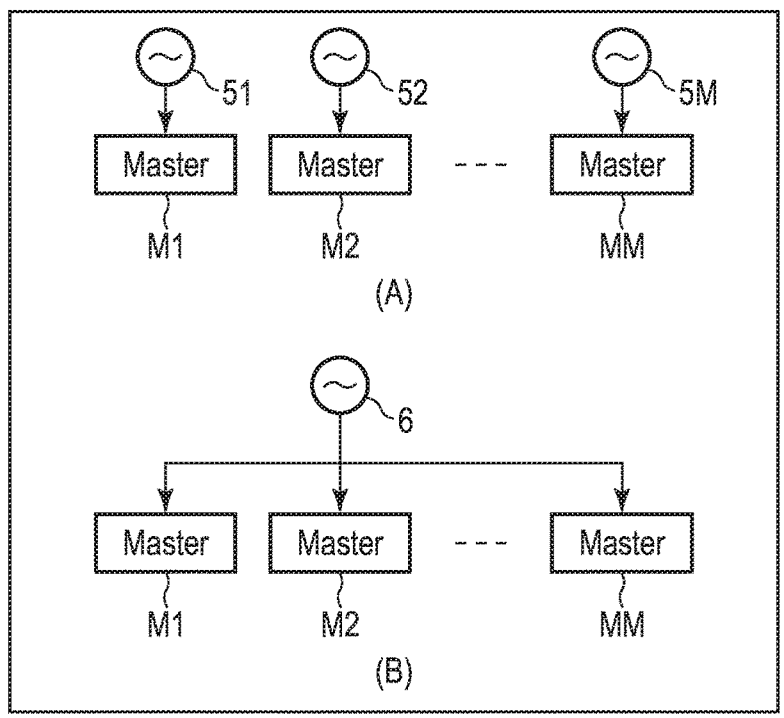
FIG. 15 is a diagram for explaining a configuration example in which multiple masters are synchronized with each other with cables.

This specification explains a configuration example for synchronizing the masters M1, M2, ..., MM with each other with a cable (or cables) with reference to FIG. 15.

FIG. 15(A) illustrates a configuration example in which the roasters M1, M2, ..., MM cannot be synchronized with each other. As illustrated in FIG. 15(A), when crystal oscillators 51, 52, ..., 5M are independently provided for the masters M1, M2, ..., MM, respectively, and the performance of each of the crystal oscillators 51, 52, ..., 5M is low, the differences between the clocks of the masters M1, M2, ..., MM change. For example, a time difference A between the clock which is the basis of the master M1 and the clock which is the basis of the master M2 shown in FIG. 14 changes, and a time difference B between the clock which is the basis of the master M1 and the clock which is the basis of the master MM shown in FIG. 14 changes. Even in a case where the channel transition patterns (in other words, channel maps) are set by calibration such that interference is not caused among the wireless communication systems 5-1, 5-2, ..., 5-M, if the time differences A and B change, there is a possibility that the periodicity of the transition patterns is collapsed, thereby causing interference among the wireless communication systems 5-1, 5-2, ..., 5-M.

By contrast, FIG. 15(B) illustrates a configuration example in which the masters M1, M2, ..., MM can be synchronized with each other. As illustrated in FIG. 15(B), in the present embodiment, a single crystal oscillator 6 connected to all the masters M1, M2, ..., MM with a cable (or cables) may be provided. In this configuration, the effect of the crystal oscillator 6 is made on all the masters M1, M2, ..., MM. In this case, even if the performance of the crystal oscillator 6 is low, and the timing of an output signal fluctuates, the effect of the fluctuated signal is made on all the masters M1, M2, ..., MM.

For this reason, in this configuration, regardless of the performance of the crystal oscillator 6, the time differences between the clocks which are the bases of the masters M1, M2, ..., MM do not change. In other words, the time differences between the clocks which are the bases of the masters M1, M2, ..., MM can be made always constant. More specifically, for example, the synchronization unit 101 of the master M1 synchronizes the master M1 and the other masters M2, ..., MM, using the crystal oscillator 6. In this way, if calibration is performed to set channel transition patterns such that interference is not caused among the wireless communication systems 5-1, 5-2, ..., 5-M, these channel transition patterns are continued in synchronization with each other. Thus, it is possible to maintain the state in which interference is not caused among the wireless communication systems 5-1, 5-2, ..., 5-M.

The cable for connecting the crystal oscillator 6 may not be equal in length for each of the masters M1, M2, ..., MM. In other words, the phases may be shifted among the masters M1, M2, ..., MM. The frequencies should be synchronized with each other. In place of the crystal oscillator 6, an ether-clock which distributes a synchronous signal to each of the masters M1, M2, ..., MM may be used.

Figure 16:
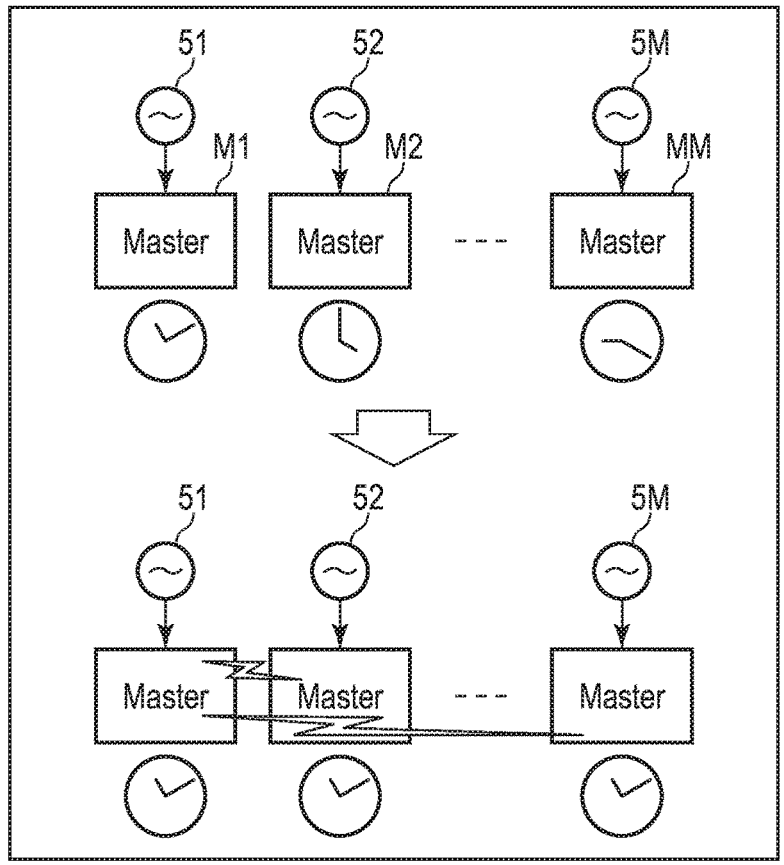
FIG. 16 is a diagram illustrating an example in which multiple masters are wirelessly synchronized with each other.

FIG. 16 illustrates a configuration example for wirelessly synchronizing the masters M1, M2, . . . , MM with each ether. For example, when crystal oscillators 51, 52, . . . , 5M are independently provided for the masters M1, M2, . . . , MM, respectively, the synchronization unit 101 of one of the masters (here, the master M1) transmits a synchronous signal to the other masters (here, the masters M2, . . . , MM) to synchronize these masters. The synchronization unit 101 of each of the masters which received the synchronous signal synchronizes the clock on the basis of the synchronous signal. In this manner, the clock of a master which transmits a synchronous signal and the clock of a master which receives the synchronous signal can be synchronized each other. The frequency selection transmission unit 102 of each of the masters M1, M2, . . . , MM transmits a packet (a signal for packet transmission) to a slave at a time point based on the clock determined by the synchronization unit 101.

FIG. 17 illustrates an example of a synchronous signal. A synchronous signal 611 may be transmitted at a certain frequency prior to a packet 612 including a preamble and a data portion. For example, a single synchronous signal 611 may be transmitted every time a single packet is transmitted. Alternatively, a single synchronous signal 611 may be transmitted every time three packets are transmitted. The frequency at which a synchronous signal 611 is transmitted may be determined in accordance with the performance of the crystal oscillator provided for the master of the receiving side. For example, as the performance of the crystal oscillator provided for the master of the receiving side is lower, a synchronous signal 611 is transmitted at higher frequency.

By the above wired or wireless configuration, the masters M1, M2, . . . , MM can be synchronized with each other.

<Synchronization Between Master and Slaves>

Figure 18:
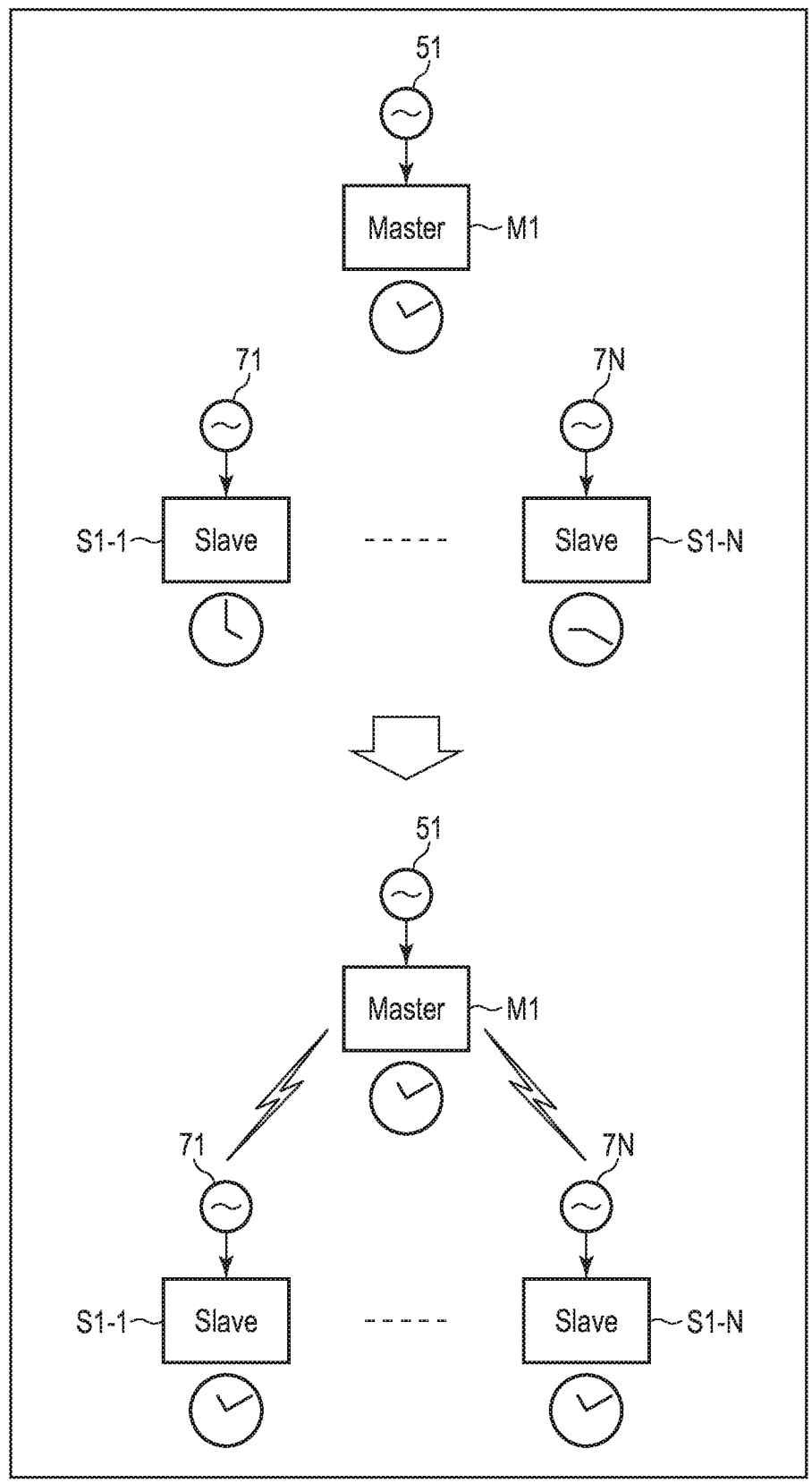
FIG. 18 is a diagram illustrating an example in which multiple slaves are wirelessly synchronized with a master.

FIG. 18 illustrates an example in which multiple slaves are wirelessly synchronized with a master. Here, as an example, this specification explains a case where the slaves S1-1, . . . , S1-N are synchronized with the master M1 in wireless communication system 5-1. However, in the other wireless communication systems 5-2, . . . , 5-N, similarly, slaves can be synchronized with a master.

For example, when a crystal oscillator 51 is provided for the master M1, and crystal oscillators 71, . . . , 7N are provided for the slaves S1-1, . . . , S1-N, respectively, the synchronization unit 101 of the master M1 transmits a synchronous signal to each of the slaves S1-1, . . . , S1-N to synchronize the slaves S1-1, . . . , S1-N with the master M1. The synchronization unit 201 of each of the slaves S1-1, . . . , S1-N which received the synchronous signal synchronizes the clock on the basis of the synchronous signal. In this manner, the clock of the master which transmits a synchronous signal and the clock of each of the slaves S1-1, . . . , S1-N which receives the synchronous signal can be synchronized each ether. The reception demodulation unit 103 of each of the masters M1, M2, . . . , MM receives a packet (a signal for packet transmission) transmitted from a slave at a time point based on the clock determined by the synchronization unit 101. An example of a synchronous signal is explained above with reference to FIG. 17.

Figure 19:
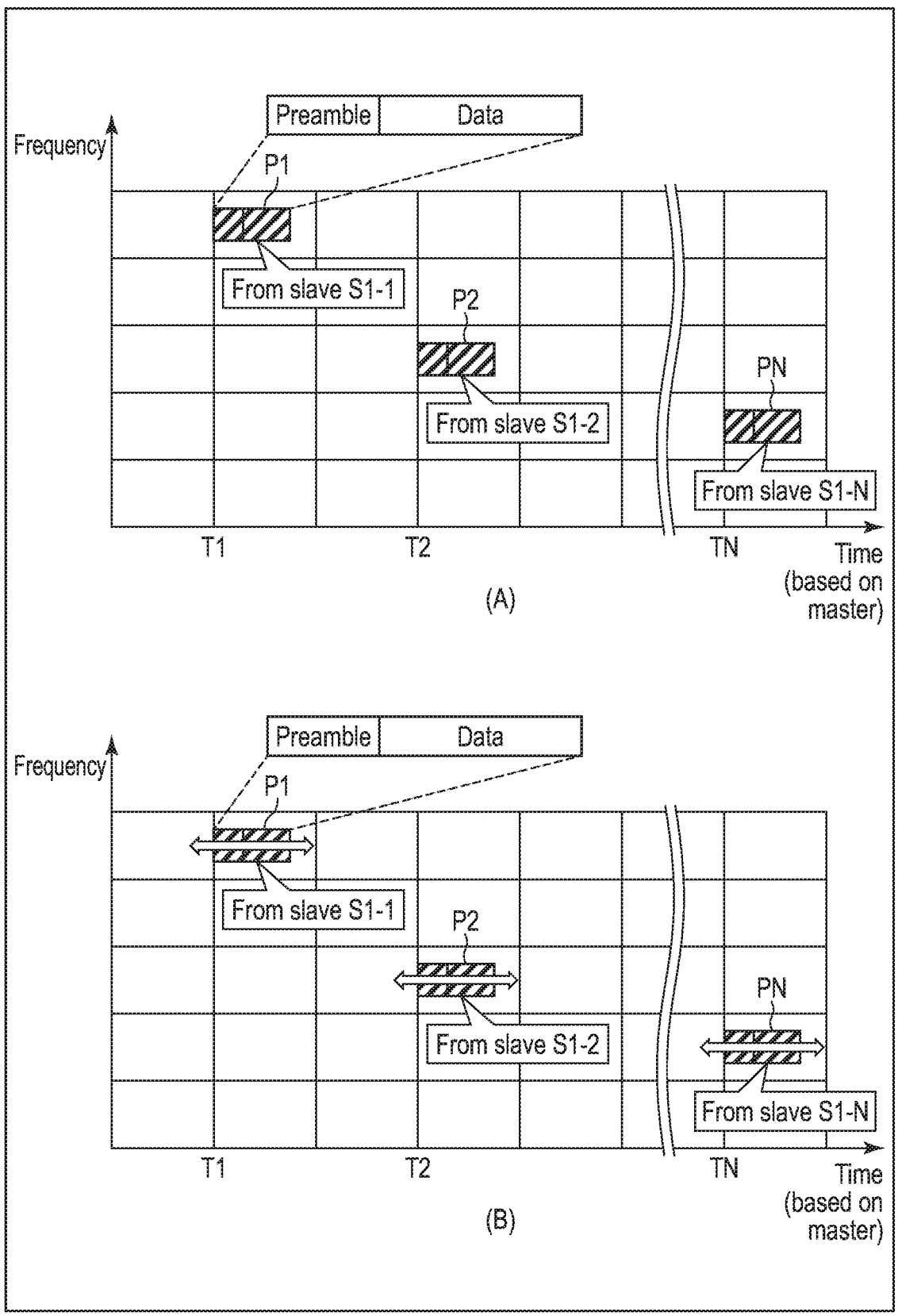
FIG. 19 is a diagram for explaining an example of the timing in which a master receives a packet from each of slaves in the case of synchronization and in the case of asynchronization.

Now, this specification explains an example of the timing in which the master M1 receives a packet from each of the slaves S1-1, S1-2, . . . , S1-N in the case of synchronization and in the case of asynchronization with reference to FIG. 19.

FIG. 19(A) illustrates an example of a case where the master M1 is synchronized with the slaves S1-1, S1-2, . . . , S1-N. The master M1 and the slaves S1-1, S1-2, . . . , S1-N use synchronized clocks. Here, it is assumed that the master M1 defines the transmission of a packet from the slaves S1-1, S1-2, . . . , S1-N to the master M1 at a specific time point (here, the initial time point of a time slot).

In this case, when the slave S1-1 transmits a packet P1 to the master M1 at a time point T1 based on the clock of the slave S1-1, the master M1 can receive the packet P1 at the time point T1 based on the clock of the master M1. When the slave S1-2 transmits a packet P2 to the master M1 at a time point T2 based on the clock of the slave S1-2, the master M1 can receive the packet P2 at the time point T2 based on the clock of the master M1. When the slave S1-N transmits a packet PN to the master M1 at a time points TN based on the clock of the slave S1-N, the master M1 can receive the packet PN at the time point TN based on the clock of the master M1.

In this manner, when the master M1 and the slaves S1-1, S1-2, . . . , S1-N use synchronized clocks, the master M1 can receive a packet at a time point which is not shifted from the defined specific time point.

In contrast, FIG. 19(B) illustrates an example of a case where the master M1 is not synchronized with the slaves S1-1, S1-2, . . . , S1-N. The clock of the master M1 is not synchronized with the clock of each of the slaves S1-1, S1-2, . . . , S1-N. Here, it is assumed that the master M1 defines the transmission of a packet from the slaves S1-1, S1-2, . . . , S1-N to the master M1 at a specific time point (here, the initial time point of a time slot).

In this case, when the slave S1-1 transmits a packet P1 to the master M1 at a time point T1 based on the clock of the slave S1-1, there is a possibility that the master M1 receives the packet P1 earlier or later than a time point T1 based on the clock of the master M1 in accordance with the time lap between the clock of the slave S1-1 and the clock of the master M1. When the slave S1-2 transmits a packet P2 to the master M1 at a time point T2 based on the clock of the slave S1-2, there is a possibility that the master M1 receives the packet P2 earlier or later than a time point T2 based on the clock of the master M1 in accordance with the time lag between the clock of the slave S1-2 and the clock of the master M1. When the slave S1-N transmits a packet PN to the master M1 at a time point TN based on the clock of slave S1-N, there is a possibility that the master M1 receives the packet PN earlier or later than a time point TN based on the clock of the master M1 in accordance with the time lag between the clock of the slave S1-N and the clock of the master M1.

In this manner, when the master M1 and the slaves S1-1, S1-2, . . . , S1-N use asynchronous clocks, there is a possibility that the master M1 receives a packet at a time point which is shifted from the defined specific time point. Thus, when the master M1 is not synchronized with the slaves S1-1, S1-2, . . . , S1-N, the timing in which the master M1 receives a packet from each of the slaves S1-1, S1-2, . . . , S1-N may fluctuate.

In the present, embodiment, as explained above with reference to FIG. 17, the master M1 can communicate with each of the slaves S1-1, S1-2, . . . , S1-N at a defined specific time point, in other words, in a defined specific time slot, by synchronizing the slaves S1-1, S1-2, . . . , S1-N with the master M1. The master M1 can communicate with the slaves S1-1, S1-2, . . . , S1-N in different time slots based on the synchronized clocks. For example, time slots used by the master M1 for communication with the slave S1-1 are different from time slots used by the master M1 for communication with the slave S1-2. In this way, even when the master M1 communicates with the slaves S1-1, S1-2, . . . , S1-N in parallel, interference is not caused.

<Detection of Packet Collision>

Figure 20:
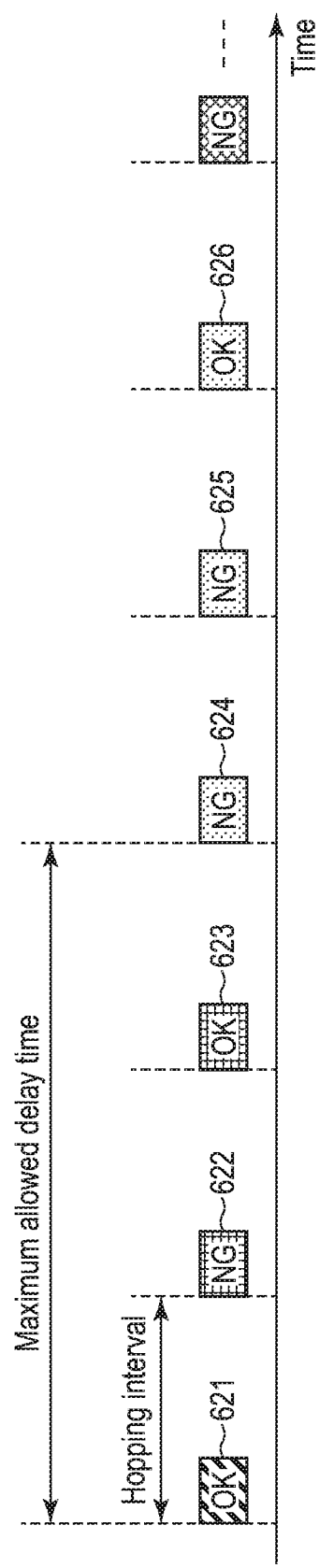
FIG. 20 is a diagram illustrating an example in which packet collision occurs within the maximum allowed delay time because of interference.
Figure 21:
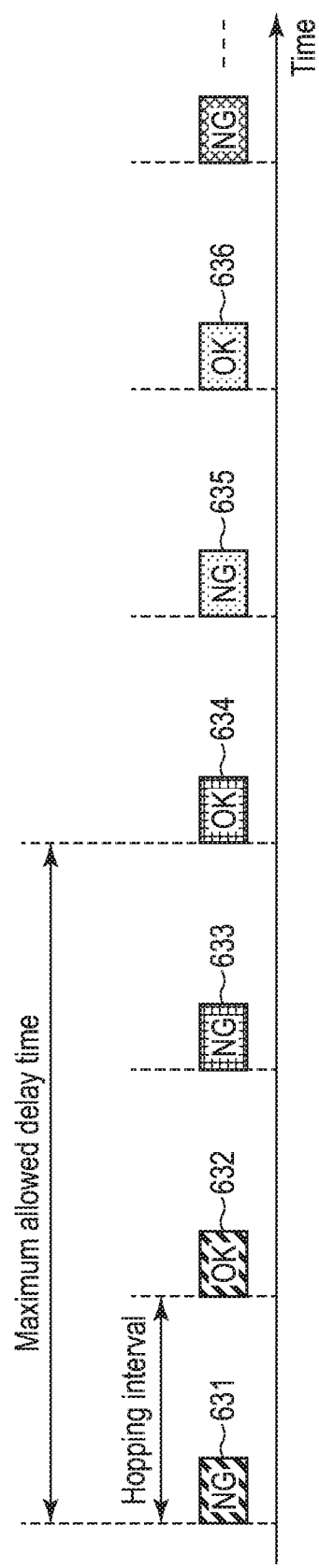
FIG. 21 is a diagram illustrating another example in which packet collision occurs within the maximum allowed delay time because of interference.
Figure 22:
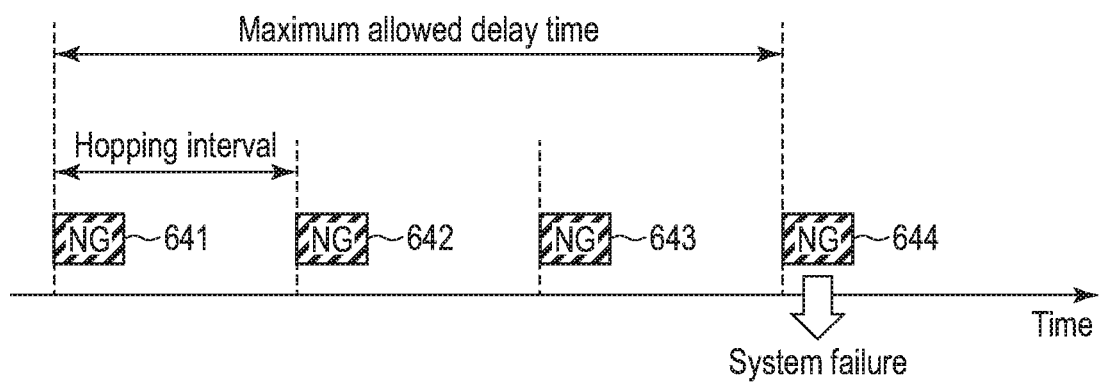
FIG. 22 is a diagram illustrating an example in which a system failure occurs after packet collision continues to occur beyond the maximum allowed delay time because of interference.

This specification explains examples in which packet collision occurs because of interference among the wireless communication systems 5-1, 5-2, . . . , 5-N with reference to FIG. 20 to FIG. 22. Here, the examples of the occurrence of packet collision are explained in operations in which the master M1 in the wireless communication system 5-1 transmits or retransmits packets to the slave S1-X. The retransmission of a packet from the master M1 to the slave S1-X indicates that, because the master M1 cannot confirm that a packet transmitted to the slave S1-X reached the slave S1-X, the master M1 retransmits the packet.

In the examples shown in FIG. 20 to FIG. 22, the rectangles illustrated with the same pattern indicate packets including the same data portions. Each packet with "OK" indicates a packet in which arrival at the slave S1-X is confirmed. Each packet, with "NG" indicates a packet in which arrival at the slave S1-X is not confirmed.

The master M1 may transmit a packet to the slave S1-X at hopping intervals. When the master M1 cannot confirm the arrival of a packet at the slave S1-X during a period from the start of transmission of the packet to the slave S1-X until the end of the maximum allowed delay time, the master M1 repeatedly retransmits the packet at hopping intervals. When the arrival of the packet at the slave S1-X cannot be confirmed even after the elapse of the maximum allowed delay time, a system failure occurs in the master M1.

When the master M1 (more specifically, the packet collision detection unit 104) transmits a first packet to the slave S1-X, and receives a second packet replying to the first packet from the slave S1-X within the hopping interval, the master M1 determines that the first packet, reached the slave S1-X. When the master M1 cannot receive the second packet for replying to the first packet from the slave S1-X within the hopping interval, the master M1 determines that the first packet did not reach the slave S1-X.

When communication in the other wireless communication systems 5-2, . . . , 5-M interferes with communication between the master M1 and the slave S1-X, for example, a packet transferred between the master M1 and the slave S1-X may collide with a packet transferred between a master and a slave in the other wireless communication systems 5-2, . . . , 5-M (for example, a packet transferred between the master M2 and the slave S2-Y). Thus, for example, a packet transmitted from the master M1 does not reach the slave S1-X, or a packet transmitted from the slave S1-X does not reach the master M1. As described above, when the master M1 cannot confirm the arrival of a packet at the slave S1-X until the end of the maximum allowed delay time, the master M1 repeatedly retransmits the packet.

FIG. 20 illustrates an example in which packet collision occurs within the maximum allowed delay time.

The master M1 confirms that a packet 621 including a first data portion reached the slave S1-X. In other words, collision between the packet 621 and packets transferred in the other wireless communication systems 5-2, . . . , 5-M does not occur.

The master M1 does not confirm that a packet 622 including a second data portion reached the slave S1-X. In other words, collision between the packet 622 and a packet transferred in the other wireless communication systems 5-2, . . . , 5-M occurs. Thus, the master M1 retransmits a packet 623 including the same second data portion as the packet 622 to the slave S1-X, and confirms that this packet 623 reached the slave S1-X.

Further, the master M1 does not confirm that a packet 624 including a third data portion reached the slave S1-X, and does not confirm that a packet 625 retransmitted after the transmission of the packet 624 and including the third data portion reached the slave S1-X. Thus, the master M1 further retransmits a packet 626 including the third data portion, and confirms that this packet 626 reached the slave S1-X.

Thus, even in the case of packet collision, when the master M1 can confirm that a packet reached the slave S1-X by retransmission within the maximum allowed delay time, the master M1 can continue to communicate with the slave S1-X without causing a system failure.

FIG. 21 illustrates another example in which packet collision occurs within the maximum allowed delay time.

The master does not confirm that a packet 631 including a first data portion reached the slave S1-X. In other words, collision between the packet 631 and a packet transferred in the other wireless communication systems 5-2, . . . , 5-M occurs. Thus, the master M1 retransmits a packet 632 including the same first data portion as the packet 631 to the slave S1-X, and confirms that this packet 632 reached the slave S1-X.

The master M1 does not confirm that a packet 633 including a second data portion reached the slave S1-X. In other words, collision between the packet 633 and a packet transferred in the other wireless communication systems 5-2, . . . , 5-M occurs. Thus, the master 511 retransmits a packet 634 including the same second data portion as the packet 633 to the slave S1-X, and confirms that this packet 634 reached the slave S1-X.

Further, the master M1 does not confirm that a packet 635 including a third data portion reached the slave S1-X. In other words, collision between the packet 635 and a packet transferred in the other wireless communication systems 5-2, . . . , 5-M occurs. Thus, the master M1 retransmits a packet 636 including the same third data portion as the packet 635 to the slave S1-X, and confirms that this packet 636 reached the slave S1-X.

Thus, in a manner similar to that of the example shown in FIG. 20, even in the case of packet collision, when the master M1 can confirm that a packet reached the slave S1-X by retransmission within the maximum allowed delay time, the master M1 can continue to communicate with the slave S1-X without causing a system failure.

FIG. 22 illustrates an example in which packet collision continues to occur beyond the maximum allowed delay time.

The master M1 does not confirm that a packet 641 including a first data portion reached the slave S1-X. In other words, collision between the packet 641 and a packet transferred in the other wireless communication systems 5-2, . . . , 5-M occurs.

Since the master M1 does not confirm that the packet 641 reached the slave S1-X, the master M1 retransmits packet 642 including the same first data portion as the packet 641 to the slave S1-X. However, the master M1 does not confirm that this packet 642 reached the slave S1-X. Since the master M1 does not confirm that the packet 642 reached the slave S1-X, the master M1 retransmits a packet 643 including the first data portion to the slave S1-X. However, the master M1 does not confirm that this packet 643 reached the slave S1-X.

Since the master M1 does not confirm that, the packet 643 reached the slave S1-X, the master M1 retransmits a packet 644 including the first data portion to the slave S1-X. However, the master M1 does not confirm that this packet 644 reached the slave S1-X. In this case, as the master M1 cannot confirm that the packets including the first data portion reached the slave S1-X even when the elapsed time from the start of the transmission of the first packet 641 including the first data portion exceeds the maximum allowed delay time, a system failure occurs.

Thus, when the packets each including the first data portion do not reach the slave S1-X within the maximum allowed delay time, a system failure is caused in the master M1, and the master M1 cannot continue to communicate with the slave S1-X.

In the present, embodiment, the packet collision detection unit 104 of the master M1 detects whether or not a packet (more specifically, a packet including a data portion) reached the slave S1-X within the maximum allowed delay time. When the packet collision detection unit 104 detects that a packet transmitted with a transition pattern did not reach the slave S1-X for more than the maximum allowed delay time, the reconfiguration unit 105 performs control such that the frequency selection transmission unit 102 transmits a packet to the slave S1-X with another transition pattern. In accordance with this control, the frequency selection transmission unit 102 transmits a packet to the slave S1-X with the other transition pattern. The frequency selection transmission unit 102, the packet collision detection unit 104 and the reconfiguration unit 105 repeat the above operation for the slave S1-X until a good transition pattern is selected. In this manner, the master M1 can communicate with the slave S1-X with a good transition pattern (channel map) in which interference with the other wireless communication systems 5-2, . . . , 5-M is reduced.

Alternatively, the wireless communication systems 5-1, 5-2, . . . , 5-M may be configured to gradually increase other operating masters after the master M1 establishes a connection with each of the slaves S1-1, S1-2, . . . , S1-N and starts an operation for selecting the transition pattern of channels. In this case, when communication between the other masters and slaves interfere with communication between the master M1 and the slaves S1-1, S1-2, . . . , S1-N, the reception power is assumed to be increased. In comparison with a case where no interference signal is present, in a case where an interference signal is present (in other words, an uncorrelated signal is added), the number of reception signals is increased. Thus, the packet collision detection unit 104 can determine whether or not interference occurs between communication between the master M1 and the slaves and communication between another master and slaves on the basis of whether or not the reception power of the master M1 is increased. More specifically, for example, the packet collision detection unit 104 may determine that a packet did not reach the slave S1-X within the maximum allowed delay time when the amount of increase in the reception power of the master M1 is greater than or equal to a threshold.

<Avoidance of Interference>

Figure 23:
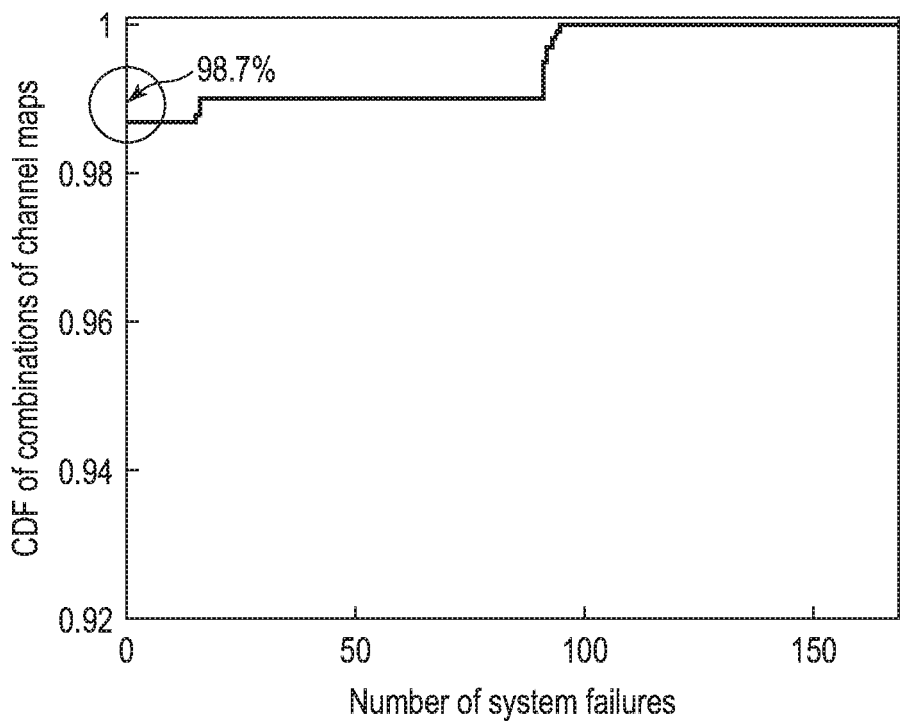
FIG. 23 is a diagram illustrating an example of the cumulative distribution function (CDF) of the combinations of channel maps for the number of system failures.

FIG. 23 illustrates an example of the cumulative distribution function (CDF) of the combinations of channel maps for the number of system failures (in other words, the number of successive packet collisions beyond the maximum allowed delay time) in a simulation using a large Humber of combinations of channel maps. In this simulation, it is assumed that three wireless communication systems are present. Three masters M1, M2 and M3 are provided for three wireless communication systems, respectively, and three sets of 20 slaves are connected to the three masters M1, M2 and M3, respectively. It is assumed that a packet can be transmitted six times within the maximum allowed delay time. In other words, the maximum allowed delay time is six times the hopping interval.

In a manner similar to that of the example illustrated in FIG. 14, there is a time difference A between the time point at which the master M1 starts communication with the 20 slaves and the time point at which the master M2 starts communication with the 20 slaves. There is a time difference B between the time point at which the master M1 starts communication with the 20 slaves and the time point at which the master M3 starts communication with the 20 slaves. The time point at which each of the masters M1, M2 and M3 starts communication with the 20 slaves is equivalent to the initial time point of the channel map generated for each of the masters M1, M2 and M3 for the simulation. In the simulation, the time differences A and B are randomly changed, and a channel map for each of the masters M1, M2 and M3 is generated using frequency hopping in which the value of the HopIncrement is randomly selected.

The CDF shown in FIG. 23 is derived by observing successive packet collisions beyond the maximum allowed delay time (in other words, a system failure) in the simulation using the combinations of channel maps that are generated for three masters M1, M2 and M3, respectively.

The example of FIG. 23 shows that, when a slave connected to a master is particularly looked at, in circumstances where the three masters M1, M2 and M3 are present, in 98.7% of the combinations of channel maps, no successive packet collisions beyond the maximum allowed delay time occur.

Figure 24:
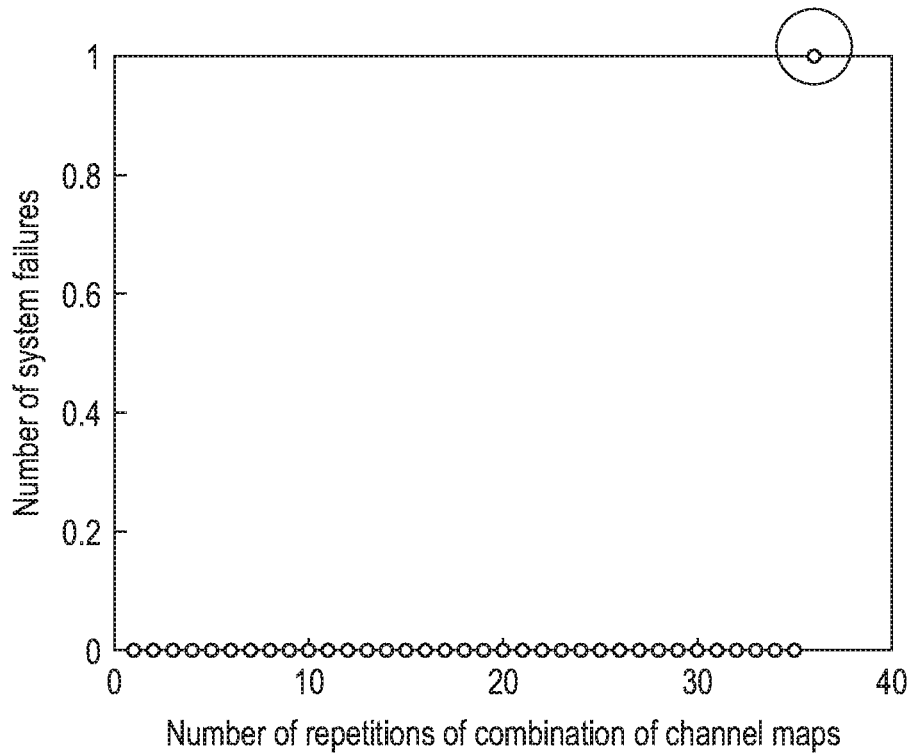
FIG. 24 is a diagram illustrating that a system failure occurs in response to a use of a combination of channel maps in a case where multiple combinations of channel maps are used in series.

FIG. 24 illustrates an example in which successive packet collisions beyond the maximum allowed delay time (a system failure) occur in a simulation in which combinations of channel maps are randomly generated. The example of FIG. 24 shows that a system failure occurs at the time point when a simulation using the combination of channel maps with a given order (here, 36th combination of channel maps) is performed.

Figure 25A:
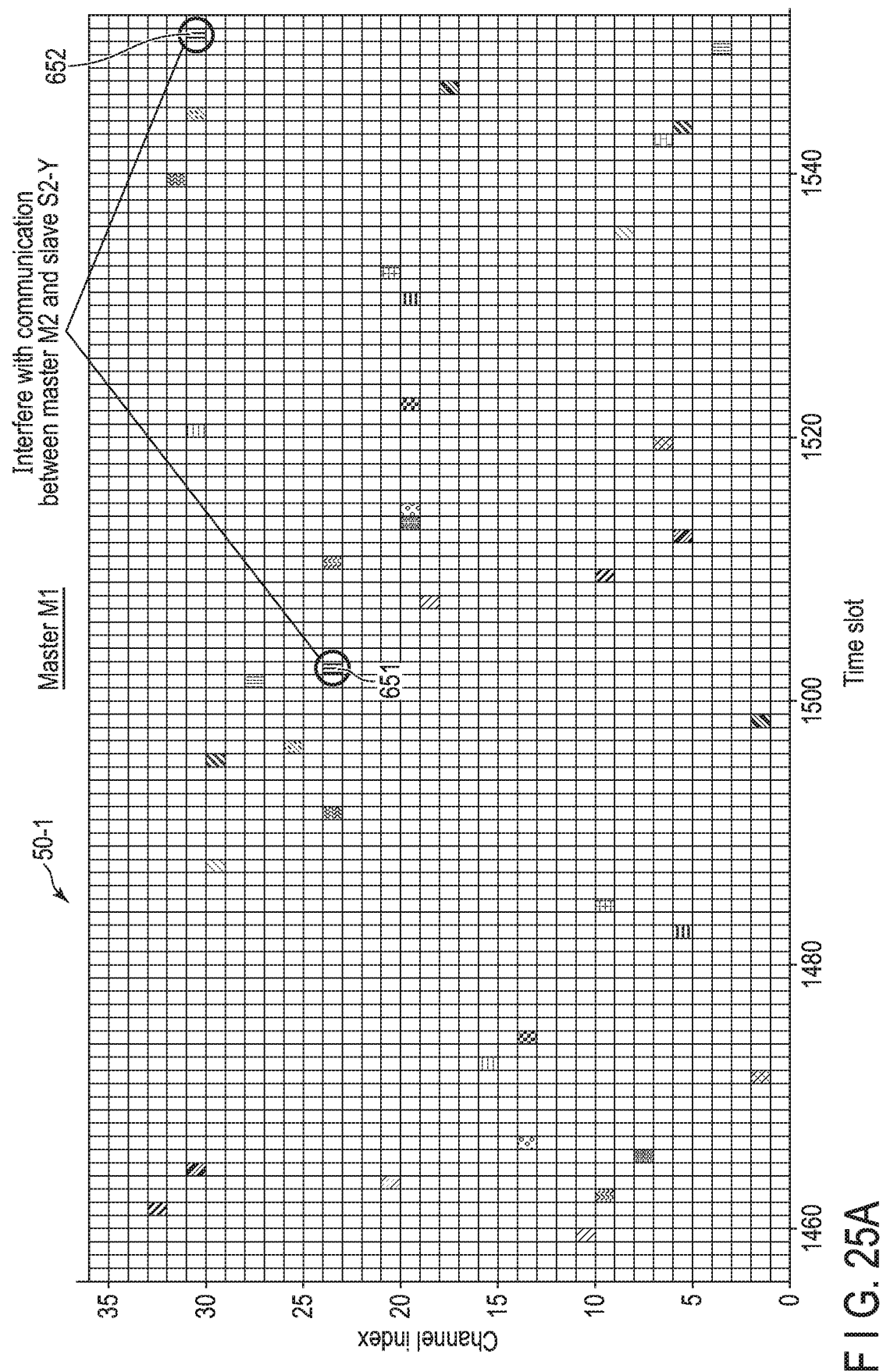
FIG. 25A is a diagram illustrating an example of the channel map of a master in a case where successive packet collisions occur.
Figure 25B:
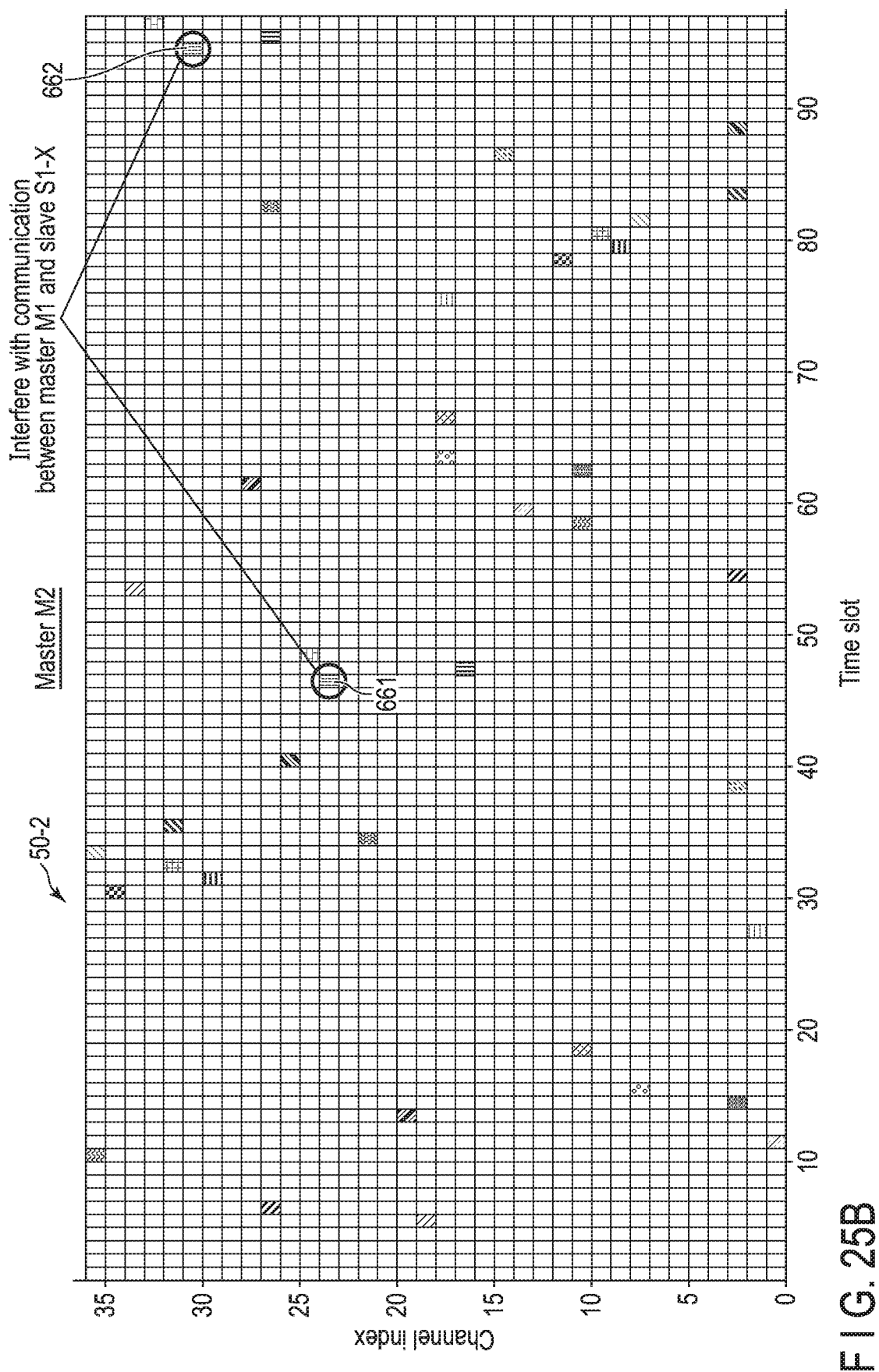
FIG. 25B is a diagram illustrating an example of the channel map of another master in a case where successive packet collisions occur.

FIG. 25A and FIG. 25B illustrate examples channel maps of the two masters M1 and M2, respectively, in a case where a packet transferred between the master M1 and the slave S1-X continues to collide with a packet transferred between she master M2 and the slave S2-Y for each frequency hop. FIG. 25A illustrates a channel map 50-1 of the master M1. FIG. 25B illustrates a channel map 50-2 of the master M2.

In the channel map 50-1 of the master M1, each of regions 651 and 652 indicates a combination of a time slot and a channel allocated for communication between the master M1 and the slave S1-X. The combination of the time slot and the channel indicated by the region 652 is allocated to the slave S1-X subsequent to the combination of the time slot and the channel indicated by the region 651, by using frequency hopping.

In the channel map 50-2 of the master M2, each of regions 661 and 662 indicates a combination of a time slot and a channel allocated for communication between the master M2 and the slave S2-Y. The combination of the time slot and the channel indicated by the region 662 is allocated to the slave S2-Y subsequent to the combination of the time slot and the channel indicated by the region 661, by using frequency hopping.

The combination of the time slot and the channel indicated ty the region 651 in the channel map 50-1 is the as the combination of the time slot and the channel indicated by the region 661 in the channel map 50-2. Thus, interference is caused between communication between the master M1 and the slave S1-X and communication between the master M2 and the slave S2-Y in a period corresponding to the regions 651 and 661.

Further, the combination of the time slot and the channel index indicted by the region 652 in the channel map 50-1 allocated after frequency hopping is also the same as the combination of the time slot and the channel index indicated by the region 662 in the channel map 50-2 allocated after frequency hopping. Thus, interference is caused between communication between the master M1 and the slave S1-X and communication between the master M2 and the slave S2-Y in a period corresponding to the regions 652 and 662.

In this case, even if frequency hopping is performed, communication between the master M1 and the slave S1-X interferes with communication between the master M2 and the slave S2-Y. Thus, successive packet collisions may occur beyond the maximum allowed delay time. However, interference is not caused between communication between the master M1 and the other slaves and communication between the master M2 and the other slaves. Thus, the figures show that the probability of occurrence of successive packet collisions beyond the maximum allowed delay time is low.

In the result of the simulation shown in FIG. 23, in communication with a slave, no system failure occurs in 98.7% of the combinations of channel maps. In this case, the probability that no system failure occurs in communication with all of the 20 slaves connected to a master is approximately 70%. ($\approx 0.987^{20}$). In terms of statistics, of 10 communication processes in three wireless communication systems, a good combination of channel maps in which no system failure occurs is obtained in seven communication processes, and a bad combination of channel maps in which a system failure occurs is obtained in three communication processes. A good combination of channel maps is a combination of channel maps in which interference is hardly caused among wireless communication systems. A bad combination of channel maps is a combination of channel maps in which interference is easily caused among wireless communication systems.

In the present embodiment, in consideration of this result, each master obtains a good time-series transition pattern of channels in which interference with the other wireless communication systems is hardly caused, before starting the operation of communication with a slave. A good time-series transition pattern of channels constitutes the above good combination of channel maps.

For example, the master M1 repeats the establishment and cancel of connection with the slave S1-X until a good time-series transition pattern of channels can be obtained. According to the above statistical tendency, the master M1 can obtain a good time-series transition pattern of channels with a less number of trials. As the obtained time-series transition pattern of channels has periodicity, even after the operation of communication with the slave S1-X is started, a good communication property in which interference with the other wireless communication systems is hardly caused can be maintained.

The master M1 can determine whether or not the time-series transition pattern of channels allocated to communication with the slave S1-X is good on the basis of whether or not successive packet collisions occur beyond the maximum allowed delay time. Thus, the master M1 can determine whether or not a time-series transition pattern of channels is good in a short time, approximately in the maximum allowed delay time.

As illustrated in FIG. 8, even in a case where the 20 slaves are connected to the single master M1, the channel map 50 may have an empty time slot which is not allocated to any slave. Thus, even in circumstances where communication processes by a large number of wireless communication systems are performed in parallel, when calibration for trying communication with a time-series transition pattern of channels for more than a specific time is performed, the master M1 can obtain a good time-series transition pattern of channels.

For example, it is assumed that the maximum allowed delay time is 360 milliseconds, and the hopping interval is 60 milliseconds. In a case where a had transition pattern is used, packet collision occurs at hopping intervals. Thus, when measurement is carried out for the maximum allowed delay time (360 milliseconds), the transition pattern can be determined as a bad transition pattern. When packet collision does not successively occur beyond the maximum allowed delay time, it is possible to continue stable communication with the transition pattern, using the periodicity. Thus, the time of calibration for trying communication with a transition pattern should be greater than or equal to the maximum allowed delay time in theory. However, in consideration of an operational margin in the actual wireless communication system 5-1, the time of calibration may be set to, for example, several seconds.

The packet collision detection unit 104 of the master M1 may calculate the statistical packet collision probability and determine the detection of packet collision by using the simulation explained above with reference to FIG. 23. In the simulation, for example, the packet collision detection unit 104 focuses attention on one slave, observes the frequency at which interference occurs, and obtains the probability P of successive packet collisions beyond the maximum allowed delay time. The packet collision detection unit 104 can estimate the probability of successive packet collisions beyond the maximum allowed delay time regarding the whole communication between the master M1 and each of N the slaves S1-1, S1-2, . . . , S1-N, by calculating p1/N.

Figure 26:
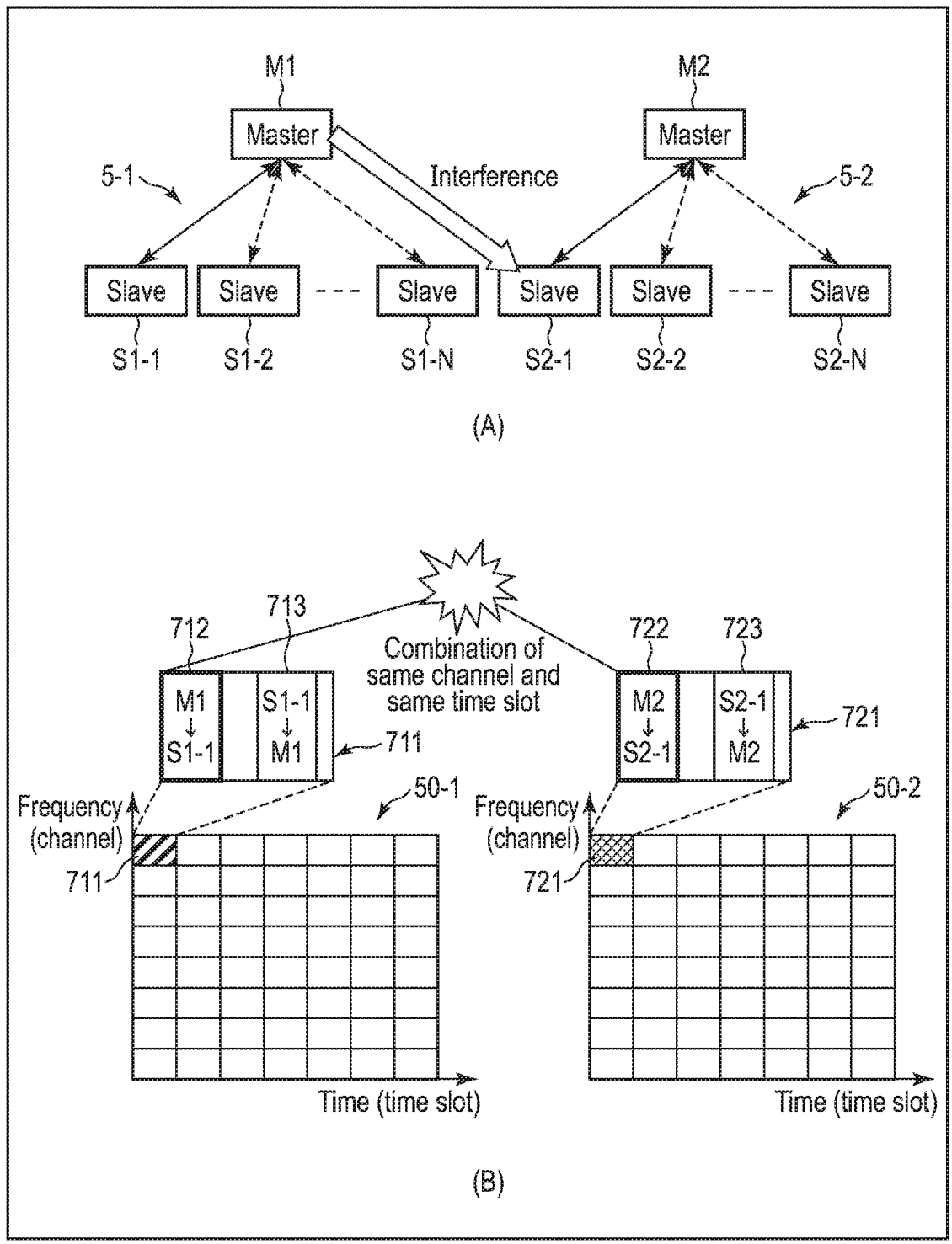
FIG. 26 is a diagram illustrating an example in which interference is caused in communication from a master to a slave.

FIG. 26 illustrates an example in which interference is caused between the two wireless communication systems 5-1 and 5-2. Here, as illustrated in FIG. 26(A), this specification exemplifies a case where communication from the master M1 to the slave S1-1 interferes with communication from the master M2 to the slave S2-1.

This case is more specifically explained with reference to FIG. 26(B), using a channel map 50-1 of the master M1 and a channel map 50-2 of master M2. A region 711 in the channel map 50-1 indicates a combination of a time slot and a channel used for communication between the master M1 and the slave S1-1. A region 721 in the channel map 50-2 indicates a combination of a time slot and a channel used for communication between the master M2 and the slave S2-1.

As the combination of the time slot and the channel indicated by the region 711 is the same as the combination of the time slot and the channel indicated by the region 721, for example, a packet 712 transmitted from the master M1 to the slave S1-1 may collide with a packet 722 transmitted from the master M2 to the slave S2-1.

Figure 27:
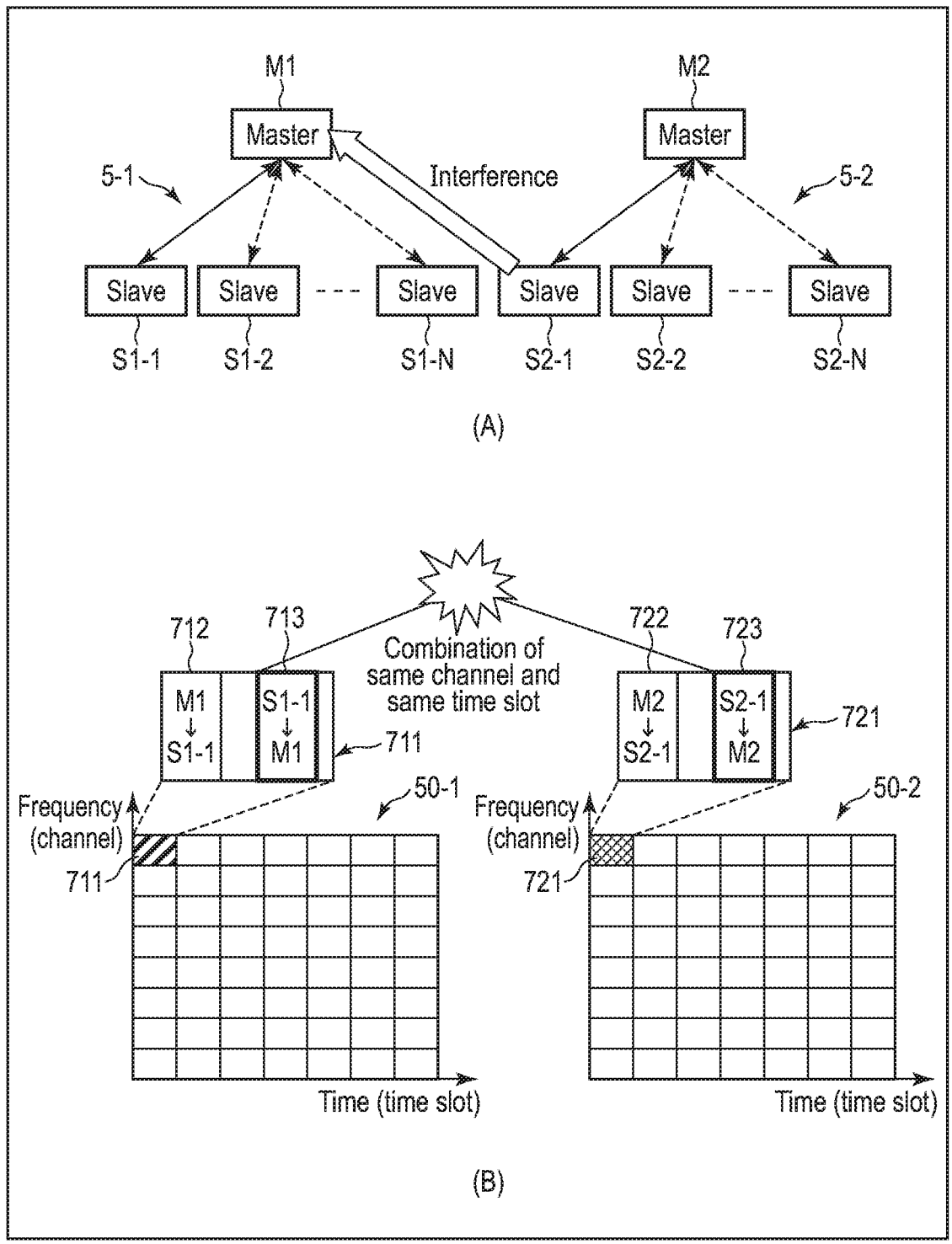
FIG. 27 is a diagram illustrating an example in which interference is caused in communication from a slave to a master.

FIG. 27 illustrates another example in which interference is caused between the two wireless communication systems 5-1 and 5-2. Here, as illustrated in FIG. 27(A), this specification exemplifies a case where communication from the slave S2-1 to the master M2 interferes with communication from the slave S1-1 to the master M1.

The channel map 50-1 of the master M1 and the channel map 50-2 of master M2 shown in FIG. 27(B) are as explained above with reference to FIG. 26(B). As the combination of the time slot and the channel indicated by the region 711 is the same as the combination of the time slot and the channel indicated by the region 721, for example, a packet 723 transmitted from the slave S2-1 to the master M2 may collide with a packet 713 transmitted from the slave S1-1 to the master M1.

Thus, as shown in FIG. 26 and FIG. 27, interference may be caused in both the communication from a master to a slave and the communication from a slave to a master.

Figure 28:
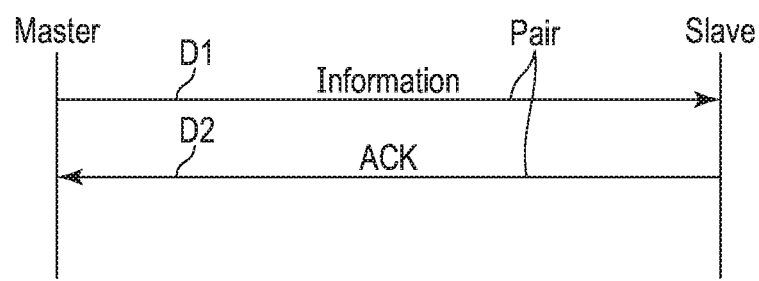
FIG. 28 is a diagram illustrating another example of the communication sequence between a master and a slave.

FIG. 28 illustrates another example of the communication sequence between the master M1 and the slave S1-X. As described above, when the master M1 and the slave S1-X perform wireless communication conformable to, for example, BLE, the transmission of information from the master M1 to the slave S1-X and the transmission of information from the slave S1-X to the master M1 are paired.

As shown in FIG. 28, this pair may be structured by transmission D1 of information from the master M1 to the slave S1-X and transmission D2 of ACK from the slave S1-X to the master M1. The master M1 can determine whether or not interference is caused on the basis of whether or not ACK is received from the slave S1-X after information is transmitted to the slave S1-X.

More specifically, the packet collision detection unit 104 of the master M1 determines that packet collision does not occur when a packet including ACK is received from the slave S1-X in a period from when a packet including information is transmitted to the slave S1-X until the end of the hopping interval. The packet collision detection unit 104 determines that, packet collision occurs when a packet including ACK is not received from the slave S1-X in a period from when a packet including information is transmitted to the slave S1-X until the end of the hopping interval. By using this determination, the packet collision detection unit 104 may detect occurrence of successive packet collisions beyond the maximum allowed delay time (a system failure) in communication with a slave.

<Reconfiguration of Allocation of Time Slot and Channel>

Figure 29:
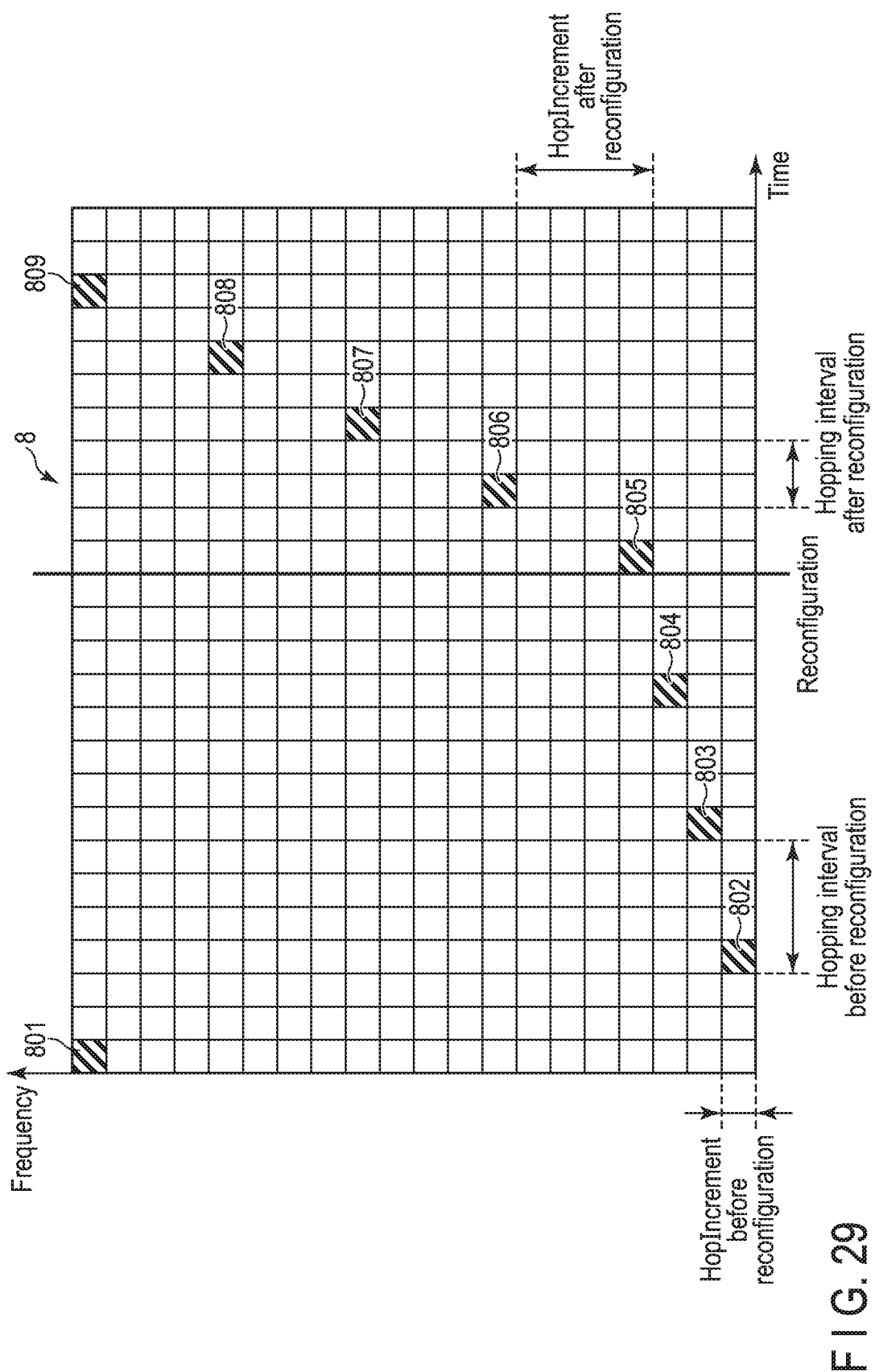
FIG. 29 is a diagram illustrating an example in which the frequency hopping is reconfigured.

FIG. 29 shows an example of a channel map 8 in a case where the master M1 reconfigures the allocation of a combination of a time slot and a channel for the slave S1-X.

The reconfiguration unit 105 of the master M1 reconfigures the allocation of channels when the packet collision detection unit 104 detects successive packet collisions beyond the maximum allowed delay time. In this case, for example, the reconfiguration unit 105 randomly selects the value used for the HopIncrement, thereby changing (resetting) the HopIncrement.

Regions 801 to 805 in the channel map 8 indicate the transition pattern of channels determined using a HopIncrement before reconfiguration (here, HopIncrement=1). Regions 806 to 800 indicate the transition pattern of channels determined using a HopIncrement after reconfiguration (here, HopIncrement=4). In this way, by changing the HopIncrement, the transition pattern of channels changes between before and after reconfiguration.

The reconfiguration unit 105 may further reconfigure the allocation of time slots when the packet collision detection unit 104 detects successive packet collisions beyond the maximum allowed delay time. In this case, the reconfiguration unit 105 changes (resets) the hopping interval. Whereas the HopIncrement is changed for each slave, the hopping interval is changed for all the slaves S1-1, S1-2, ..., S1-N connected to the master M1. The hopping interval is used as a common value to all the slaves S1-1, S1-2, ..., S1-N.

Figure 31:
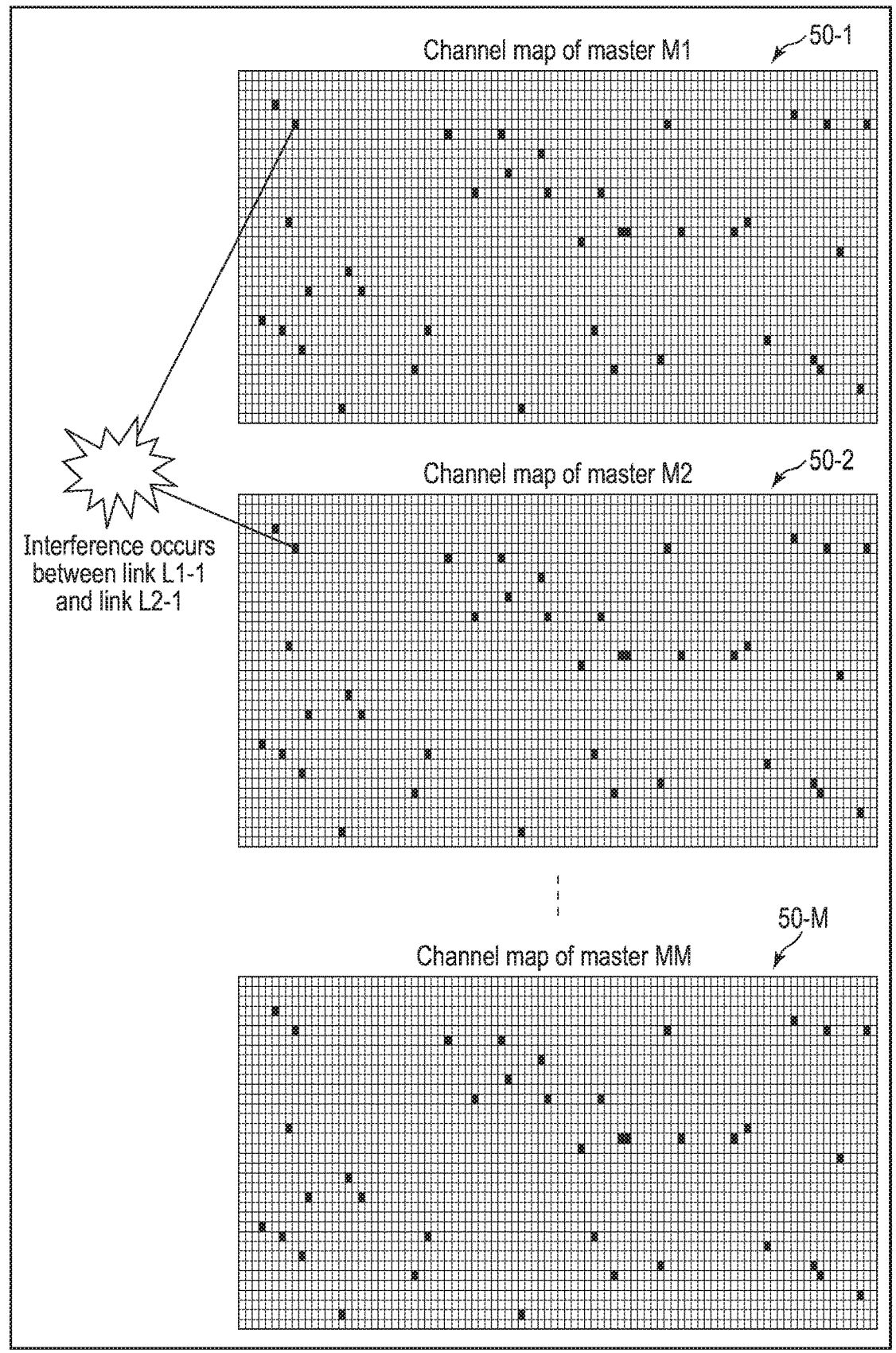
FIG. 31 is a diagram illustrating an example of channel maps in a case where interference is caused between two links.

Now, this specification explains an example of a link to be reconfigure in a case where successive packet collisions are detected beyond the maximum allowed delay time with reference to FIG. 30 and FIG. 31.

FIG. 30 illustrates an example in which successive packet collisions are detected beyond the maximum allowed delay time in the wireless communication systems 5-1, 5-2, ..., 5-M. Here, connections for communication between the master M1 and the slaves S1-1, S1-2, ..., S1-N are called links L1-1, L1-2, ..., L1-N, respectively. Connections for communication between the master M2 and the slaves S2-1, S2-2, ..., S2-N are called links L2-1, L2-2, ..., L2-N, respectively.

In the example shown in FIG. 30, successive packet collisions are detected beyond the maximum allowed delay time between the link L1-1 between the master M1 and the slave S1-1 and the link L2-1 between the master M2 and the slave S2-1. The interference between the two links L1-1 and L2-1 can be also confirmed with, for example, channel maps 50-1, 50-2, ..., 50-M illustrated in FIG. 31.

In this case, the reconfiguration unit 105 of the master M1 reconfigures, for example, the channel allocation (in other words, the channel transition pattern) for the link L1-1. The reconfiguration unit 105 of the master M1 may reconfigure the channel allocation for all the links L1-1, L1-2, ..., L1-N of the master M1. Alternatively, the reconfiguration unit 105 of the master M1 may reconfigure the allocation of channels and time slots for all the links L1-1, L1-2, ..., L1-N of the master M1.

In addition, the reconfiguration unit 105 of the master M2 reconfigures, for example, the channel allocation for the link L2-1. The reconfiguration unit 105 of master M2 may reconfigure the channel allocation for all the links L2-1, L2-2, ..., L2-N of the master M2. Alternatively, the reconfiguration unit 105 of the master M2 may reconfigure the allocation of channels and time slots for all the links L2-1, L2-2, ..., L2-N of the master M2.

Regarding the operation by the reconfiguration unit 105 of the master M1 and the operation by the reconfiguration unit 105 of the master M2, only one of the operations may be performed, or both of them may be performed.

Figure 32:
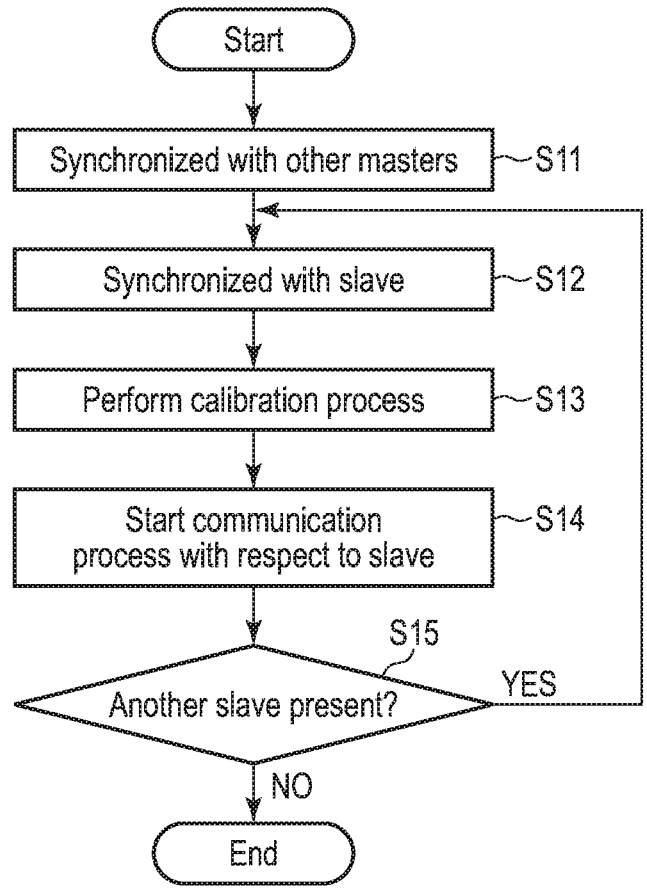
FIG. 32 is a flowchart illustrating an example of the procedure for a communication control process performed by a master.

This specification explains an example of the procedure for a communication control process performed by each of the masters M1, M2, ..., MM, with reference to FIG. 32 to FIG. 34. To make descriptions easily understood, this specification exemplarily shows a case where the master M1 of the masters M1, M2, ..., MM performs the communication control process. However, every master may perform the communication control process in the same manner.

FIG. 32 is a flowchart showing an example of the procedure for a communication control process performed by the master M1.

The master M1 and the other masters M2, ..., MM are synchronized each other (step S11). The master M1 may use the crystal oscillator 6 to which all the masters M1, M2, ..., MM are connected with cables in order to synchronize the other masters M2, ..., MM with the master M1. Alternatively, the master M1 may wirelessly transmit a synchronous signal to each of the other masters M2, ..., MM in order to synchronize the other masters M2, ..., MM with the master M1.

Subsequently, the master M1 and at least one of the slaves S1-1, S1-2, ..., S1-N are synchronized each other (step S12). The slave to be synchronized with the master M1 is, for example, a slave in which connection with the master M1 is to be established. The master M1 wirelessly transmit a synchronous signal to synchronize this slave with the master M1.

The synchronization with the other masters M2, ..., MM and the synchronization with each of the slaves S1-1, S1-2, ..., S1-N may be carried out at regular intervals afterward.

Subsequently, the master M1 performs a calibration process regarding the time-series transition pattern of channels used for the communication with the synchronized slave S1-X (step S13). In the calibration process, the pattern of frequency hopping for determining the channel used for communication with the slave S1-X is selected so as to reduce interference between the wireless communication system 5-1 including the master M1 and the other wireless communication systems 5-2, ..., 5-M. In response to the completion of the calibration process, the time-series transition pattern of channels used for communication with the slave S1-X determined. An example of the detailed procedure for the calibration process is explained later with reference to the flowchart of FIG. 33.

The master M1 starts a communication process with the slave S1-X, using the determined time-series transition pattern of channels (step S14). In the communication process, the caste transmits a packet to the slave S1-X and receives a packet from the slave S1-X in the channel specified in accordance with the determined time-series transition pattern of channels. Further, in the communication process, when new interference with the other wireless communication systems 5-2, ..., 5-M is caused, a calibration process may be performed so as to reduce the interference. An example of the detailed procedure for the communication process in explained later with reference to the flowchart of FIG. 34.

Subsequently, the master M1 determines whether or not another slave in which connection with the master M1 to be established is present (step S15). When another slave in which connection to be established is present (YES in step S15), the process returns to step S12, and a process regarding the other slave is performed.

When another slave in which connection to be established is not present (NO in step S15), the communication control process is terminated.

By executing the above communication control process, communication can be performed with the good transition pattern of channels selected so as to reduce the interference between each of the slaves S1-1, S1-2, ..., S1-N in which connection is established, and the other wireless communication systems 5-2, ..., 5-M.

FIG. 33 is a flowchart showing an example of the procedure for a calibration process performed by the master M1. Here, this specification exemplarily shows a case where the master M1 performs the calibration process for the slave S1-X indicative of one of the slaves S1-1, S1-2, ..., S1-N. However, the other masters M2, ..., MM may also perform the calibration process in the same manner for the slaves S2-1, S2-2, ..., S2-N, SM-1, SM-2, ..., SM-N connected to the masters M2, ..., MM.

The master M1 establishes a connection with the slave S1-X (step S201). For example, the master M1 and the slave S1-X conformable to BLE, establish a connection through the state of advertisement.

Subsequently, the master M1 determines the value of the HopIncrement for determining the transition pattern of channels used for communication with the slave sets 0 as the last channel index, and starts the measurement of the calibration time (step S202). The HopIncrement indicates the frequency interval at which the channel used for the communication with the slave S1-X hops. For example, the master M1 conformable to BLE uses the integer randomly selected from integers from 5 to 16 as the HopIncrement.

The lass channel index indicates the index of the channel lastly used for the communication with the slave S1-X. After the connection is established, in the initial state before the start of communication, the master M1 sets 0 as the last channel index. The calibration time indicates the time (period) in which communication is tried with the time-series transition pattern of channels using the determined value of the HopIncrement.

The master M1 determines the channel to be used for communication with the slave S1-X, using the last channel index and the HopIncrement (step S203). For example, the master M1 substitutes the last channel index (i.e., LastUnmappedChannel) and the HopIncrement into the above equation (1), thereby determining the channel to be used for communication with the slave S1-X. The master M1 transmits a packet to the slave S1-X at the determined channel and starts the measurement of the transmission time (step S204). The transmission time indicates the time from when the master M1 transmits a packet including first information (data portion) to the slave S1-X until the master M1 receives a packet including second information in response to the first information from the slave S1-X. The second information is information obtained in the slave S1-X or information indicative of a reply to the first information (for example, ACK).

The master M1 determines whether or not a packet has been received from the slave S1-X at the determined channel within the hopping interval (step S205). When a packet has been received (YES in step S205), in other words, when packets have been transmitted and received without causing packet collision by interference with the other wireless communication systems 5-2, ..., 5-M, the master M1 sets, as the last channel index, the index of the channel which is currently used (step S206). The master M1 determines whether or not the calibration time exceeds a threshold (step S207). The threshold is equivalent to a period (for example, several seconds) which allows sufficient confirmation that the communication using the time-series transition pattern of channels with the value of the HopIncrement determined in step S202 hardly interferes with the other wireless communication systems 5-2, ..., 5-M.

When the calibration time is less than or equal to the threshold (NO in step S207), the process returns to step S203, and the trial of communication with the time-series transition pattern of channels determined using the value of the HopIncrement is continued.

When the calibration time exceeds the threshold (YES in step S207), the master M1 terminates the calibration process. Since the trial of communication with the time-series transition pattern of channels determined using the value of the HopIncrement is sufficiently carried out, the master M1 determines that the transition pattern of channels suitable for communication with the slave S1-X is selected. In this manner, it is possible to avoid continuous occurrence of packet collisions with respect to the other wireless communication systems 5-2, ..., 5-M.

When no packet has been received from the slave S1-X at the determined channel within the hopping interval (NO in step S205), in other words, when it is presumed that packet collision occurs because of interference with the other wireless communication systems 5-2, ..., 5-M in at least one of the transmission of a packet and reception of a packet, the master M1 determines whether or not the transmission time exceeds the maximum allowed delay time (step S208).

When the transmission time is less than or equal to the maximum allowed delay time (NO in step S208), the master M1 sets, as the last channel index, the index of the channel which is currently used (step S209). The master M1 determines the new channel to be used for communication with the slave S1-X, using the last channel index and the HopIncrement (step S210). The master M1 retransmits a packet to the slave S1-X at the determined channel (step S211), and returns to step S205. The master M1 performs a process on the basis of whether or not a packet has been received from the slave S1-X at the new channel.

In contrast, when the transmission time exceeds the maximum allowed delay time (YES in step S208), the master M1 cancels the connection with the slave S1-X (step S212) and returns to step S201. More specifically, as packet collision continuously occurs with respect to the other wireless communication systems 5-2, . . . , 5-M in the communication with the time-series transition pattern of channels determined using the current value of the HopIncrement, the master M1 determines that the selected transition pattern of channels is inappropriate. Thus, the master M1 re-establishes a connection with the slave S1-X, thereby further trying communication with a transition pattern of channels that is determined using a new value of the HopIncrement. Thus, the procedure for the calibration process is repeated until an appropriate transition pattern of channels is selected.

By executing the above calibration process, the master M1 can select a good time-series transition pattern of channels for the current communication situation with respect to the slave S1-X. The master M1 firstly selects a good transition pattern of channels after connection with the slave S1-X is established. As the selected transition pattern of channels has periodicity, it is possible to continue the communication with the slave S1-X while maintaining the state in which interference with the other wireless communication systems 5-2, . . . , 5-M is reduced.

FIG. 34 is a flowchart showing an example of the procedure for a communication process performed by the master M1. As stated above with reference to the flowchart of FIG. 32, the master M1 starts the communication process after the calibration process is completed. Here, this specification exemplarily shows a case where the master M1 performs the communication process for the slave S1-X. However, the other masters M2, . . . , MM may also perform the communication process in the same manner for each of the slaves S2-1, S2-2, . . . , S2-N, SM-1, SM-2, . . . , SM-N connected to the masters M2, . . . , MM, respectively.

The master M1 determines the channel to be used for communication with the slave S1-X, using the last channel index and the HopIncrement (step S301). The master M1 transmits a packet, to the slave S1-X at the determined channel and starts the measurement of the transmission time (step S302).

Subsequently, the master M1 determines whether or not a packet has been received from the slave S1-X at the determined channel within the hopping interval (step S303). When a packet has been received (YES in step S303), in other words, when packets have been transmitted and received without causing packet collision by interference with the other wireless communication systems 5-2, . . . , 5-M, the master M1 performs a process in accordance with the received packet (step S304), and sets, as the last channel index, the index of the channel which is currently used (step S305).

The master M1 determines whether or not the communication with the slave S1-X should be finished (step S306). When the communication with the slave S1-X should be continued (NO in step S306), the process returns to step S301, and a process for transmitting a packet and receiving a packet at the next channel determined with frequency hopping is performed.

In contrast, when the communication with the slave S1-X should be finished. (YES in step S306), the master M1 cancels the connection with the save S1-X (step S307), and terminates the communication process.

When a packet has not been received from the slave S1-X at the determined channel within the hopping interval (NO in step S303), the master M1 determines whether or not the transmission time exceeds the maximum allowed delay time (step S308). When the transmission time is less than or equal to the maximum allowed delay time (NO in step S308), the master M1 sets, as the last channel index, the index of the channel which is currently used (step S309). The master M1 determines the new channel to be used for communication with the slave S1-X, using the last channel index and the HopIncrement (step S310). The master M1 retransmits a packet to the slave S1-X at the determined channel (step S311), and returns to step S303. The master M1 performs a process on the basis of whether or not a packet has been received from the slave S1-X at the new channel.

In contrast, when the transmission time exceeds the maximum allowed delay time (YES in step S308), the master M1 cancels the connection with the slave S1-X (step S212). The master M1 performs the calibration process for the slave S1-X (step S313), and returns to step S301. The specific procedure for the calibration process is as explained above with reference to the flowchart of FIG. 33. As packet collision continuously occurs with respect to the other wireless communication systems 5-2, . . . , 5-M in the communication using the transition pattern of channels determined using the current value of the HopIncrement, the master M1 determines that the selected transition pattern of channels is inappropriate. The master M1 selects a time-series transition pattern of channels suitable for the current communication situation with respect to the slave S1-X by performing the calibration process again.

When the transmission time exceeds the maximum allowed delay time, the master M1 may perform the calibration process for all the slaves S1-1, S1-2, . . . , S1-N connected to the master M1 instead of performing the calibration process for only the slave S1-X. In other words, the master M1 may reselect an appropriate time-series transition pattern of channels regarding each of the slaves S1-1, S1-2, . . . , S1-N.

By executing the above communication process, the master M1 can transmit a packet and receive a packet in accordance with a good time-series transition pattern of channels obtained by performing the calibration process. When the communication situation becomes worse, the master M1 can reselect a good time-series transition pattern of channels by performing the calibration process again.

FIG. 35 is a flowchart showing an example of the procedure for a communication control process performed by each of the slaves S1-1, S1-2, . . . , S1-N, S2-1, S2-2, . . . , S2-N, SM-1, SM-2, . . . , SM-N. To make descriptions easily understood, this specification exemplarily shows a case where the slave S1-X performs the communication control process. However, every slave may perform the communication control process in the same manner.

The slave S1-X and the master M1 to be connected with the slave S1-X are synchronized each other (step S51). The slave S1-X uses, for example, a synchronous signal received from the master M1 for synchronizing the slave S1-X with the master M1. The slave S1-X may receive a synchronous signal from the master M1 at regular intervals to be synchronized with the master M1.

The slave S1-X establishes a connection with the master M1 (step S52). The slave S1-X and the master M1 conformable to, for example, BLE establish a connection through the state of advertisement.

The slave S1-X determines whether or not a packet has been received from the master M1 (step S53). When a packet has been received (YES in step S53), the slave S1-X transmits, at the channel at which the packet is received, a packet for a reply to the master M1 (step S54). The master M1 may notify in advance the slave S1-X of the channel used for the transmission and reception of packets. Alternatively, the slave S1-X may determine that the channel at which a packet is received from the master M1 is the channel to be used for transmitting a packet for a reply to the master M1.

When no packet has been received from the master M1 (NO in step S53), the procedure of step S54 is skipped.

Subsequently, the slave S1-X determines whether or not the connection with the master M1 is canceled (step S55). When the connection with the master M1 is not canceled (NO in step S55), the process returns to step S53, and a process for the reception and transmission of packets is continued.

In contrast, when the connection with the master M1 is canceled (YES in step S55), the slave S1-X terminates the communication control process. For example, the slave S1-X returns to the state of advertisement.

By executing the above communication control process, the slave S1-X can receive a packet from the master M1 and transmit a packet to the master M1 at the channel determined by the master M1.

As explained above, in the present embodiment, interference with the ocher wireless communication systems can be reduced. The frequency selection transmission unit 102 of the master M1 transmits a signal to the slave S1-X with one of patterns including at least a first pattern which is a first order and which uses first to n-th frequency bands in first to n-th periods and a second pattern which is a second order different from the first order and which uses the first to n-th frequency bands in the first to n-th periods in accordance with a communication situation, where n is an integer greater than or equal to two. The packet collision detection unit 104, the reconfiguration unit 105 and the frequency selection transmission unit 102 switch the pattern to be used among the patterns in accordance with the communication situation. The reception demodulation unit 103 receives a signal from a slave S1-X at the same frequency band as one of the first to n-th frequency bands used at the time of lastly transmitting a signal to the slave S1-X.

The reception demodulation unit 202 of the slave S1-X receives a signal from the master M1 with the transition pattern determined by the master M1 in accordance with the communication situation from patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two. The transmission unit 203 transmits a signal to the master M1 at the same frequency band as one of the first to n-th frequency bands used at the time of lastly receiving a signal from the master M1.

In this manner, the master M1 communicates with the slave S1-X with the good transition pattern switched in accordance with the communication situation. Thus, interference with the other wireless communication systems 5-2, . . . , 5-M can be reduced.

Further, each of various functions described in the present embodiment may be realized by a circuit (processing circuit). For example, the processing circuit includes a programmed processor such as a central processing unit (CPU). The processor executes each described function by executing a computer program (instructions) stored in a memory. The processor may be a microprocessor including an electric circuit. For example, the processing circuit includes a digital signal processor (DSP), an application specific integrated circuit (ASIC), a microcontroller, a controller and other electric circuit components. Each of the components described in the present embodiment other than the CPU may be also realized by a processing circuit.

Since various types of processing of the present embodiment may be realized by a computer program, the same effects as those of the present embodiment can be easily realized by only installing the computer program into a computer by way of a computer readable storage medium storing the computer program and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a transmitter to transmit a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two;
    a processor configured to switch a pattern to be used among the patterns in accordance with a communication situation; and
    a receiver to receive a signal from the first electronic apparatus at the same frequency band as one of the first to n-th frequency bands used at the time the signal was last transmitted to the first electronic apparatus,
    wherein the transmitter:
        transmits a first signal to the first electronic apparatus at a first frequency band,
        transmits the first signal to the first electronic apparatus at a second frequency band when a second signal is not received from the first electronic apparatus at the first frequency band after the first signal is transmitted at the first frequency band, and
        transmits the first signal to the first electronic apparatus at a third frequency band when a third signal is not received from the first electronic apparatus at the second frequency band after the first signal is transmitted at the second frequency band.

2. The electronic apparatus of claim 1, wherein the processor is configured to determine the patterns using a first method for periodically changing a frequency band.

3. The electronic apparatus of claim 2, wherein the processor is configured to determine each of the patterns using the first method with a parameter which is randomly determined.

4. The electronic apparatus of claim 2, wherein the first method is frequency hopping.

5. The electronic apparatus of claim 1, wherein the processor is configured to switch the pattern to be used among the patterns by canceling connection with the first electronic apparatus and establishing connection with the first electronic apparatus in accordance with the communication situation.

6. The electronic apparatus of claim 1, wherein the processor is configured to switch the pattern to be used among the patterns by restarting at least one of the transmitter and the receiver in accordance with the communication situation.

7. The electronic apparatus of claim 1, wherein the transmitter transmits, when the first signal transmitted with the first pattern did not reach the first electronic apparatus for more than a first time, the first signal with the second pattern.

8. The electronic apparatus of claim 7, wherein the transmitter:
  transmits the first signal to the first electronic apparatus at the first frequency band,
  transmits the first signal to the first electronic apparatus at the second frequency band when the second signal is not received from the first electronic apparatus at the first frequency band after elapse of a second time from the transmission of the first signal at the first frequency band, and
  transmits the first signal to the first electronic apparatus at the third frequency band when the third signal is not received from the first electronic apparatus at the second frequency band after elapse of the second time from the transmission of the first signal at the second frequency band.

9. The electronic apparatus of claim 8, wherein the first time is an integral multiple of the second time.

10. The electronic apparatus of claim 2, further comprising a first synchronization unit configured to synchronize the electronic apparatus and a second electronic apparatus which transmits a signal with a pattern determined using the first method.

11. The electronic apparatus of claim 10, wherein the first synchronization unit is configured to use a crystal oscillator connected to the electronic apparatus and the second electronic apparatus with cables for synchronizing the electronic apparatus and the second electronic apparatus, or transmit a synchronous signal to the second electronic apparatus for synchronizing the electronic apparatus and the second electronic apparatus.

12. The electronic apparatus of claim 10, wherein the transmitter transmits a signal to the first electronic apparatus at a time point determined by the first synchronization unit.

13. The electronic apparatus of claim 10, further comprising a second synchronization unit configured to synchronize the first electronic apparatus and the electronic apparatus.

14. The electronic apparatus of claim 13, wherein the second synchronization unit is configured to transmit a synchronous signal to the first electronic apparatus for synchronizing the first electronic apparatus and the electronic apparatus.

15. The electronic apparatus of claim 13, wherein the receiver receives a signal transmitted from the first electronic apparatus at a time point determined by the second synchronization unit.

16. A method comprising:
  transmitting a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two;
  switching a pattern to be used among the patterns in accordance with a communication situation; and
  receiving a signal from the first electronic apparatus at the same frequency band as one of the first to n-th frequency bands used at the time the signal was last transmitted to the first electronic apparatus,
  wherein the transmitting comprises:
    transmitting a first signal to the first electronic apparatus at a first frequency band,
    transmitting the first signal to the first electronic apparatus at a second frequency band when a second signal is not received from the first electronic apparatus at the first frequency band after the first signal is transmitted at the first frequency band, and
    transmitting the first signal to the first electronic apparatus at a third frequency band when a third signal is not received from the first electronic apparatus at the second frequency band after the first signal is transmitted at the second frequency band.

17. An electronic apparatus comprising:
  a transmitter to transmit a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two;
  a processor configured to switch a pattern to be used among the patterns in accordance with a communication situation; and
  a receiver to receive a signal from the first electronic apparatus at the same frequency band as one of the first to n-th frequency bands used at the time the signal was last transmitted to the first electronic apparatus,
  wherein the transmitter transmits a first signal to the first electronic apparatus with a third pattern which is a third order different from the first order and the second order and which uses the first to n-th frequency bands in the first to n-th periods when the first signal transmitted with the second pattern did not reach the first electronic apparatus for more than a first time.

18. A method comprising:
  transmitting a signal to a first electronic apparatus with one of patterns including at least a first pattern which is a first order and which uses first to n-th frequency bands in first to n-th periods and a second pattern which is a second order different from the first order and which uses the first to n-th frequency bands in the first to n-th periods, where n is an integer greater than or equal to two;
  switching a pattern to be used among the patterns in accordance with a communication situation; and receiving a signal from the first electronic apparatus at the same frequency band as one of the first to n-th frequency bands used at the time the signal was last transmitted to the first electronic apparatus, wherein the transmitting comprises transmitting a first signal to the first electronic apparatus with a third pattern which is a third order different from the first order and the second order and which uses the first to n-th frequency bands in the first to n-th periods when the first signal transmitted with the second pattern did not reach the first electronic apparatus for more than a first time.

* * * * *